(12) United States Patent
Barua et al.

(10) Patent No.: US 11,748,870 B2
(45) Date of Patent: Sep. 5, 2023

(54) VIDEO QUALITY MEASUREMENT FOR VIRTUAL CAMERAS IN VOLUMETRIC IMMERSIVE MEDIA

(71) Applicant: Intel Corporation, Santa Clara, CA (US)

(72) Inventors: Debashish Barua, Santa Clara, CA (US); Fai Yeung, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 16/585,445

(22) Filed: Sep. 27, 2019

(65) Prior Publication Data
US 2021/0097667 A1   Apr. 1, 2021

(51) Int. Cl.
| | |
|---|---|
| G06T 7/00 | (2017.01) |
| H04N 13/117 | (2018.01) |
| G06F 18/211 | (2023.01) |
| H04N 23/698 | (2023.01) |
| G06V 10/764 | (2022.01) |
| G06V 10/82 | (2022.01) |
| G06V 20/20 | (2022.01) |
| G06V 40/18 | (2022.01) |
| H04N 23/90 | (2023.01) |

(52) U.S. Cl.
CPC ............ *G06T 7/001* (2013.01); *G06F 18/211* (2023.01); *G06T 7/0002* (2013.01); *G06T 7/97* (2017.01); *G06V 10/764* (2022.01); *G06V 10/82* (2022.01); *G06V 20/20* (2022.01); *G06V 40/18* (2022.01); *H04N 13/117* (2018.05); *H04N 23/698* (2023.01); *G06T 2207/10016* (2013.01); *G06T 2207/10028* (2013.01); *G06T 2207/20084* (2013.01); *G06T 2207/30168* (2013.01); *G06T 2207/30228* (2013.01); *H04N 23/90* (2023.01)

(58) Field of Classification Search
None
See application file for complete search history.

(56) References Cited

U.S. PATENT DOCUMENTS

| | | | | |
|---|---|---|---|---|
| 2014/0003712 | A1* | 1/2014 | Eid | G06V 10/507 |
| | | | | 382/164 |
| 2020/0050923 | A1* | 2/2020 | Patney | G06N 3/0454 |
| 2020/0265634 | A1* | 8/2020 | Nakazato | G06T 7/70 |
| 2021/0035291 | A1* | 2/2021 | Wiemker | A61B 6/5252 |
| 2021/0390673 | A1* | 12/2021 | Ban | G06T 7/194 |

* cited by examiner

*Primary Examiner* — Yanna Wu
(74) *Attorney, Agent, or Firm* — NICHOLSON DE VOS WEBSTER & ELLIOTT LLP

(57) ABSTRACT

Apparatus and method for determining a quality score for virtual video cameras. For example, one embodiment comprises: a region of interest (ROI) detector to detect regions of interest within a first image generated from a first physical camera (PCAM) positioned at first coordinates; virtual camera circuitry and/or logic to generate a second image positioned at the first coordinates; image comparison circuitry and/or logic to establish pixel-to-pixel correspondence between the first image and the second image; an image quality evaluator to determine a quality value for the second image by evaluating the second image in view of the first image.

27 Claims, 37 Drawing Sheets

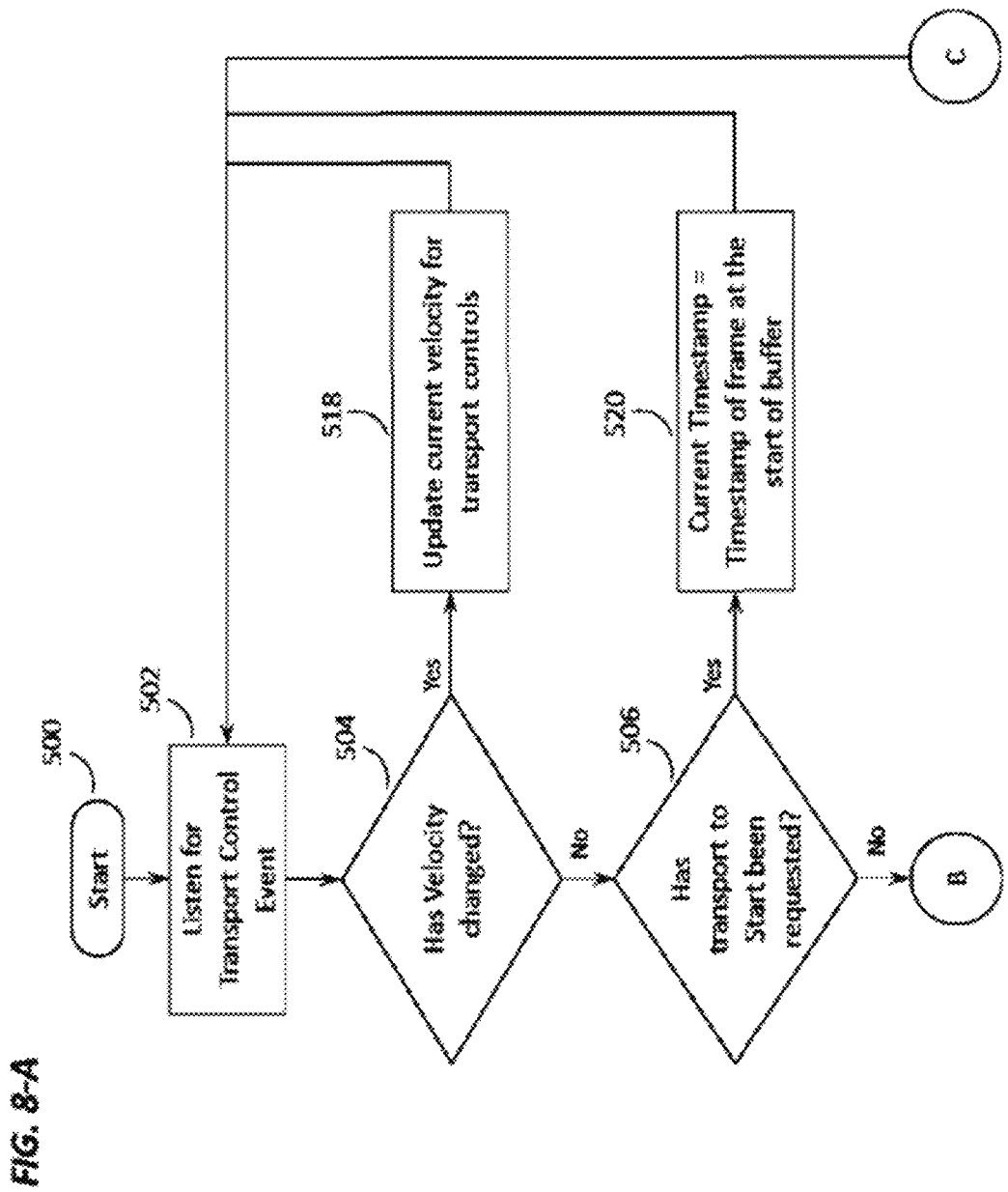
FIG. 8-A

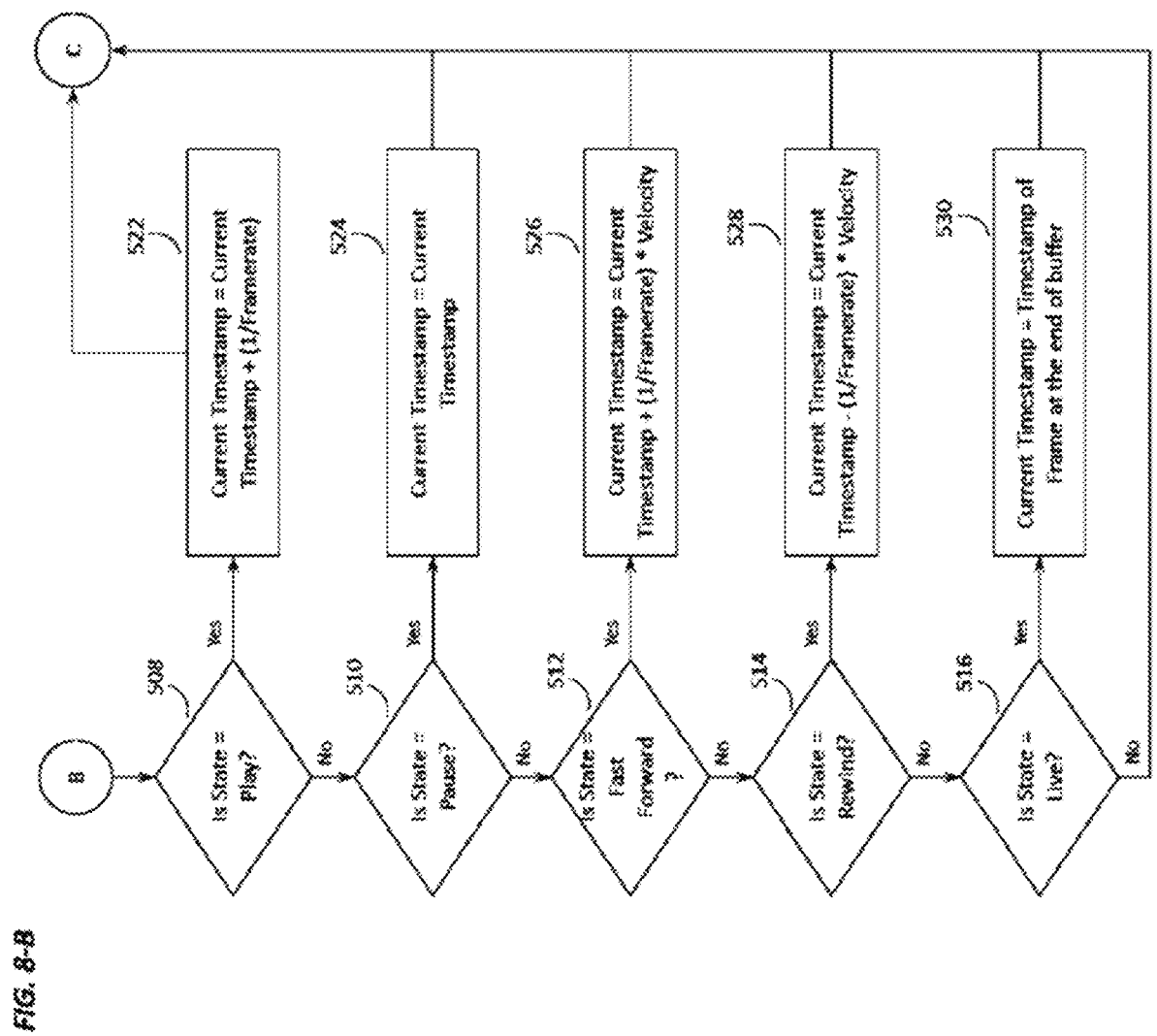
FIG. 8-B $$N_1 = \frac{1}{4}(1-s_1)(1-s_2) - \frac{1}{2}N_5 - \frac{1}{2}N_8 + \frac{1}{4}N_9$$

$$N_2 = \frac{1}{4}(1+s_1)(1-s_2) - \frac{1}{2}N_5 - \frac{1}{2}N_6 + \frac{1}{4}N_9$$

$$N_3 = \frac{1}{4}(1+s_1)(1+s_2) - \frac{1}{2}N_6 - \frac{1}{2}N_7 + \frac{1}{4}N_9$$

$$N_4 = \frac{1}{4}(1-s_1)(1+s_2) - \frac{1}{2}N_7 - \frac{1}{2}N_8 + \frac{1}{4}N_9$$

$$N_5 = \frac{1}{2}(1-s_1^2)(1-s_2) - \frac{1}{2}N_9$$

$$N_6 = \frac{1}{2}(1+s_1)(1-s_2^2) - \frac{1}{2}N_9$$

$$N_7 = \frac{1}{2}(1-s_1^2)(1+s_2) - \frac{1}{2}N_9$$

$$N_8 = \frac{1}{2}(1-s_1)(1-s_2^2) - \frac{1}{2}N_9$$

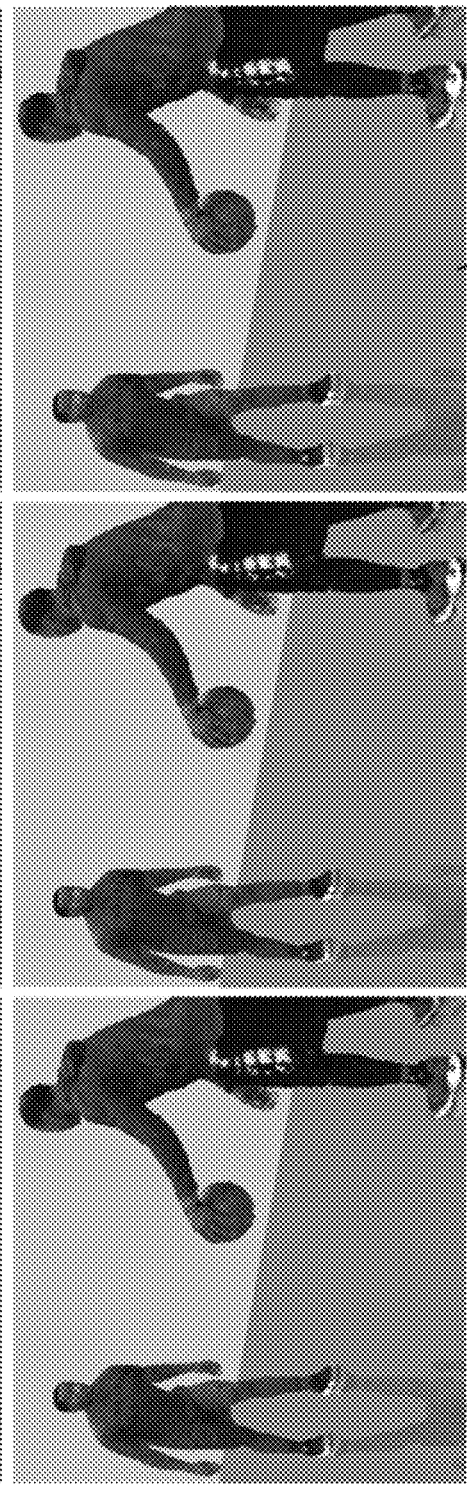
FIG. 28

VIDEO QUALITY MEASUREMENT FOR VIRTUAL CAMERAS IN VOLUMETRIC IMMERSIVE MEDIA

BACKGROUND

Field of the Invention

This disclosure pertains to videography, image capture, and playback. More particularly, this disclosure relates to systems and methods for user controlled virtual camera for volumetric video.

Description of the Related Art

Techniques are known for using video of a sporting event captured from multiple cameras and using the video to generate a virtual reality (VR) environment. However, these previous solutions are limited to a static view of the event, where the perspective within the VR environment is pre-selected. The way that a user is able to control and view the sports events in those previous solutions is extremely limited and non-interactive.

BRIEF DESCRIPTION OF THE DRAWINGS

A better understanding of the present invention can be obtained from the following detailed description in conjunction with the following drawings, in which:

FIG. 8A-B is an embodiment of how the Transport Control Events are handled by the viewing application initiated at start 500;

FIGS. 26A-B illustrate techniques for mapping a Lagrange parent element to an irregular Lagrange element;

FIG. 28 illustrates how image quality is impacted by different point sizes;

DETAILED DESCRIPTION

This disclosure is submitted in furtherance of the constitutional purposes of the U.S. Patent Laws "to promote the progress of science and useful arts" (Article 1, Section 8).

Embodiments of the present invention disclose an apparatus and method for receiving a video stream from a plurality of Panoramic Video Camera Heads or from a local storage disk, storing the video data in a local memory buffer, and viewing regions of interest within any one of the panoramic videos using user interface devices, while controlling the video time, playback speed, and playback direction globally across all panoramic video data in a synchronous manner. According to one construction, multiple Panoramic Video Camera Heads and are synchronized through a time code generator that triggers the image capture across all camera heads synchronously. According to another construction, multiple camera heads are synchronized by one "Master" camera head that sends trigger signals to all the camera heads. Further, according to yet another construction, each camera head is set to "free-run" with a pre-defined frame rate, and the processing computers all capture the latest frame from each of these cameras and timestamp them with a time code from a time code generator.

Various embodiments herein are described with reference to the figures. However, certain embodiments may be practiced without one or more of these specific details, or in combination with other known methods and configurations. In the following description, numerous specific details are set forth, such as specific configurations and methods, etc., in order to provide a thorough understanding of the present disclosure. In other instances, well-known construction techniques and methods have not been described in particular detail in order to not unnecessarily obscure the present disclosure. Reference throughout this specification to "one embodiment" or "an embodiment" means that a particular feature, configuration, composition, or characteristic described in connection with the embodiment is included in at least one embodiment. Thus, the appearances of the phrase "in one embodiment" or "an embodiment" in various places throughout this specification are not necessarily referring to the same embodiment. Furthermore, the particular features, configurations, compositions, or characteristics may be combined in any suitable manner in one or more embodiments.

As used herein, the term "Transport Control" is understood to mean a user interface that allows a viewer to control the video playback, such as choosing between play, pause, rewind and forward, and the speed of rewind or forward.

Figure 1:
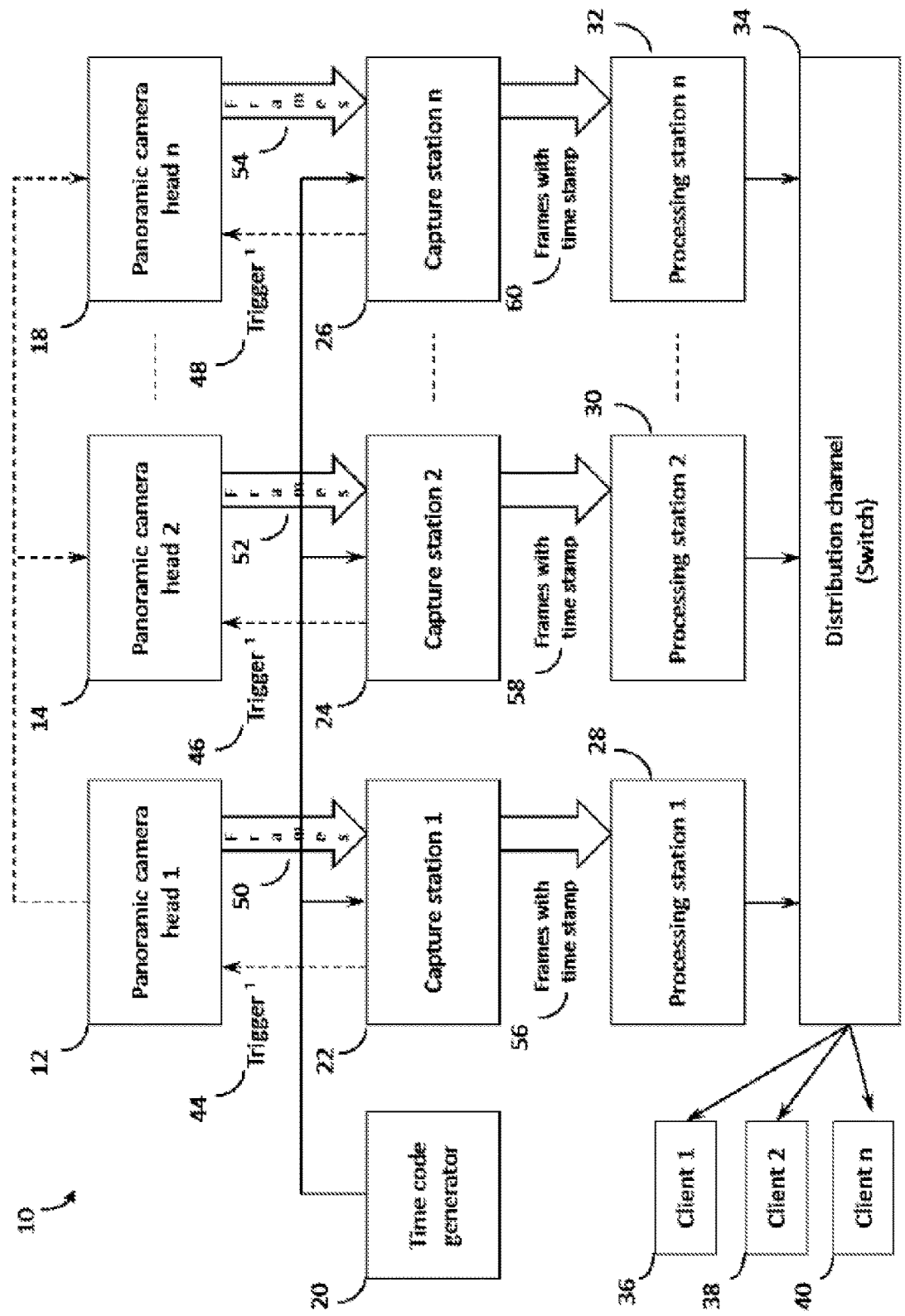
FIG. 1 is an embodiment of construction of the time code synchronization mechanism 10 extending across a plurality of panoramic camera heads 12, 14 and 18 and capture stations 22, 24 and 25.

FIG. 1 shows construction of the time code synchronization mechanism 10 extending across a plurality of panoramic camera heads 12, 14 and 18 and capture stations 22, 24 and 25. A time code generator 20 is used to get a consistent time stamp based on the desired rate that frames 50, 52 and 54 need to be captured from the panoramic cameras 12, 14 and 18. The same time code from time code generator 20 is received by each of the Capture Stations 22, 24 and 26, and in one of the embodiments of this mechanism, the time code is used to trigger[1] 44, 46 and 48 the panoramic cameras 12, 14 and 18. This is also referred to as a "software trigger" 44, 46 and 48 of the panoramic cameras 12, 14 and 18. The panoramic cameras 12, 14 and 18 capture a frame 50, 52 and 54 when triggered by trigger 44, 46 and 48, respectively, and return the frame 50, 52 and 54 to the corresponding Capture Stations 22, 24 and 26 that generated the trigger 44, 46 and 48. The Capture Stations 22, 24 and 26 attach the time-stamp information from the time code to the frames, forming "frames with time stamps" 56, 58 and 60. Because the time-code is shared between Capture Stations 22, 24 and 26, the frames 56. 58 and 60 generated from each of the Capture Stations 22, 24 and 26 for a given time-code are synchronized, as they have the same timestamp. These frames 56, 58 and 60 are then transmitted to the Processing Station 28, 30 and 32, respectively, where they are compressed for transmission over the network and sent to some Distribution Channel 34. The time-stamp information on the frames 56, 58 and 60 is maintained throughout this processing, compression, and distribution process. The distribution device, or channel (switch) 34 is configured to distribute the processed images or compressed video stream to client processors in clients 36, 38 and 40. Clients 36, 38 and 40 also include memory.

Another embodiment of the time code synchronization mechanism 10 of FIG. 1 involves triggering the panoramic camera heads 12, 14 and 18 using a "hardware sync trigger[2]" 42. The hardware trigger 42 is generated at specific time intervals based on the desired frame rate. This rate of hardware triggering has to match the rate of time codes being generated by the time code generator 20. One of the panoramic camera heads 12, 14 and 18 acts as a "Master" and all other panoramic camera heads 12, 14 and 18 act as "Slaves". The "Master" panoramic camera triggers itself and all the "Slave" panoramic cameras synchronously. When a trigger is generated, a frame is captured at the panoramic camera 50, 52 or 54. Once the frame 50, 52 or 54 is captured, an event is invoked at the Capture Station 22, 24 or 26, and this is when the Capture Station 22, 24 or 26 "grabs" the frame from the camera 12, 14 or 18, and associates the time stamp corresponding to the latest time-code received from the time-code generator 20 to the frame 50, 52 or 54.

A third embodiment of the time code synchronization mechanism 10 of FIG. 1 involves letting the panoramic cameras 12, 14 and 18 capture frames in a "free run" mode, where each of the panoramic cameras 12, 14 and 18 trigger as fast as possible. The Capture Station 22, 24 and 26 uses the time code signal to "grab" the latest frame 50, 52 or 54 that was captured by the panoramic camera 12, 14 or 18, and associates the time stamp corresponding to the time-code with the frame.

Figure 2:
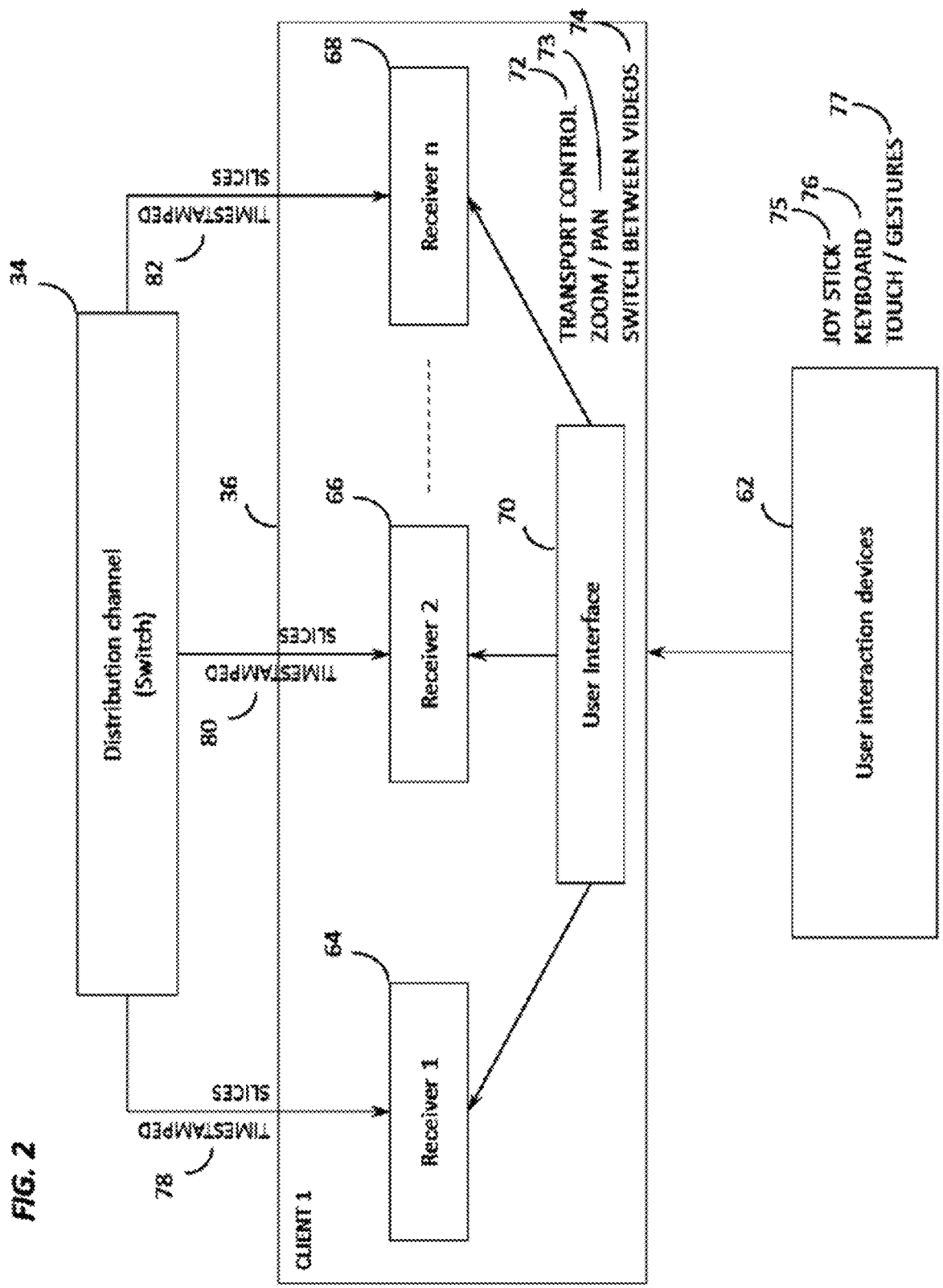
FIG. 2 is an embodiment of multiple receivers 64, 66 and 68 on a client machine 36 receiving time-stamped slices 78, 80 and 82, respectively, from the panoramic video feeds via distribution channel 34.

FIG. 2 shows multiple receivers 64, 66 and 68 on a client machine 36 receiving time-stamped slices 78, 80 and 82, respectively, from the panoramic video feeds via distribution channel 34. A user interface 70 on the client machine 36 determines which receiver is the active receiver 64, 66 or 68 displayed to the user. User interface 70 also manages the user interaction input from devices 62 like a joystick 75, a keyboard 76, and a touch or gesture based device(s) 77. User interface 70 uses this input to determine which client stream should be the active stream (switch between videos 74), and what section of the panoramic video should be displayed (zoom/tilt/pan 73) to the end-user. Another input from the user-interaction devices is the input related to transport control 72. User interface 70 uses this input and passes it on to all the receivers. This enables all the receivers to perform the same transport control operations to their respective panoramic video streams, and ensures that all the panoramic video streams are synchronized.

Figure 3:
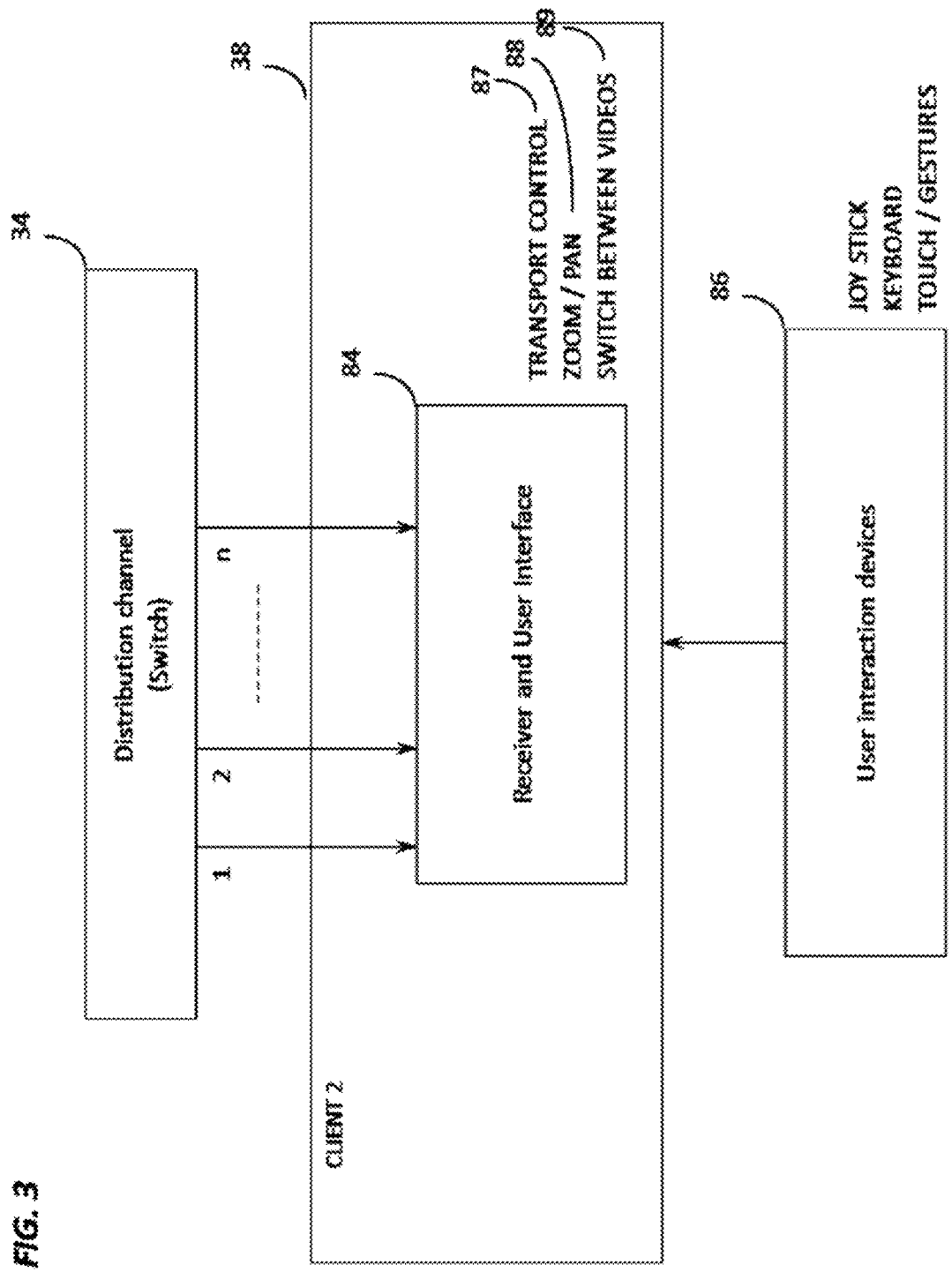
FIG. 3 is an embodiment of the client application on the viewer machine.

FIG. 3 shows another embodiment of the client application on the viewer machine. In this embodiment, a single application serves as the receiver and user interface 84. The receiver receives time-stamped frames for all the panoramic video streams via distribution channel 34 and manages each of these streams in its own application memory. The receiver also includes processing circuitry. User interface functionality described in FIG. 2 is also integrated in this application. As described in FIG. 2, the user interface manages the input from the user interaction devices 86 and performs the actions for switching between videos 89, what section of the panoramic video should be displayed (zoom/pan/tilt 88) to the end-user, and how to apply the transport control 87 to all the streams in memory.

Figure 4:
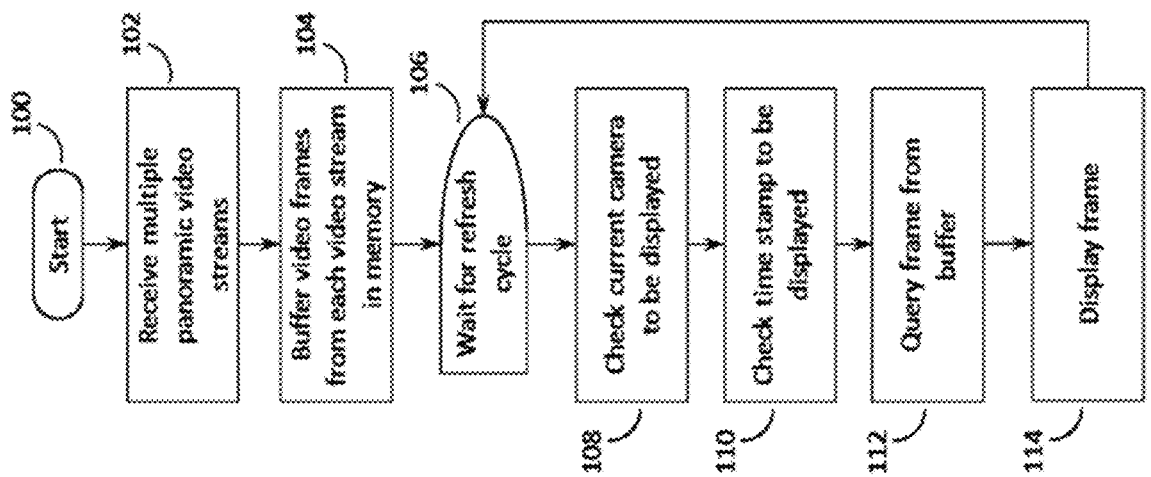
FIG. 4 is an embodiment of the steps involved in a viewer machine to receive multiple panoramic video streams and determine the frame to be displayed to the end user.

The following variables are stored with the controller module for receiver and user interface 84 that determine the state of the view that is displayed to the end-user: a. Current Camera to be displayed b. Current Time Stamp of the frame to be displayed c. Current Video Playback State—Possible values are Play, Pause, Fast Forward, Rewind, Live d. Current Viewport—The viewport is determined by the current zoom, pan, and tilt values The user interaction devices 86 could generate the following types of events that are handled by the receiver and user interface 84: a. Camera Changed Event b. Video Playback State Changed Event c. Viewport Changed Event d. Transport Control Event FIG. 4 shows the steps involved in a viewer machine to receive multiple panoramic video streams and determine the frame to be displayed to the end user. The frames from each panoramic video stream that is received by the viewer machine 102 are buffered in memory (Hard disk drive, application memory, or any other form of storage device) 104. Each frame received by the viewer machine has a time-stamp associated with it, which serves as the key to synchronize frames across multiple panoramic streams. Once the frames have started buffering, the viewer application enters a refresh cycle loop starting with a "wait for refresh cycle" 106. The refresh cycle is a periodic set of operations performed by the application at every refresh interval of the display. The viewing application stores the information about the panoramic camera being displayed 108 and the information about the time stamp to be displayed based on the playback state of the application and user inputs related to transport controls. For each refresh cycle, the application checks the current panoramic camera that needs to be displayed, and then checks for the time stamp to be displayed 110. Using these two pieces of information, the appropriate frame to be displayed is sought from the buffer in memory 112. This frame is then passed on to the application for display 114 in that refresh cycle.

Figure 5:
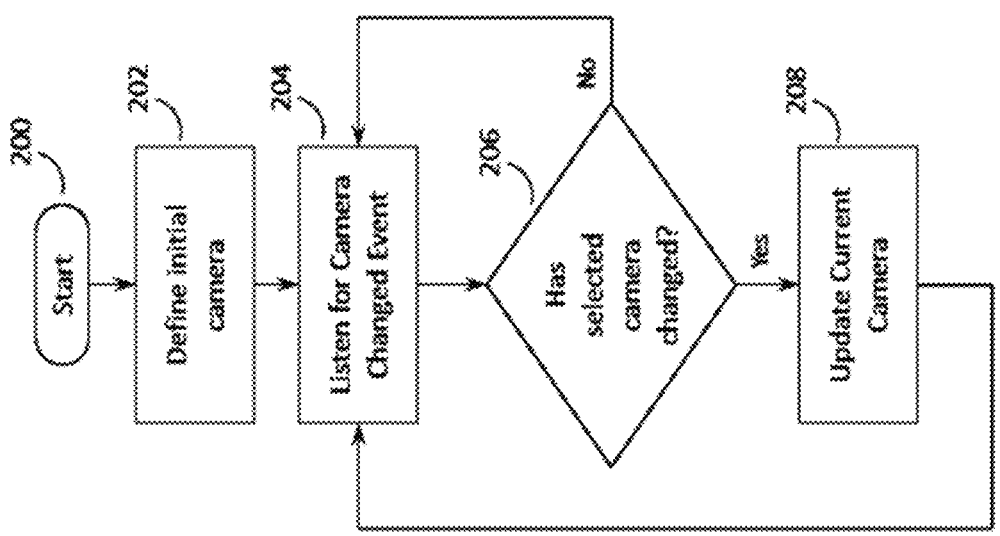
FIG. 5 is an embodiment of the steps involved in handling the Camera Changed Event triggered by the user.

FIG. 5 shows the steps involved in handling the Camera Changed Event triggered by the user. An initial camera is used, or defined 202 as the default after initiating a start 200. Then the application goes into a 'listen' mode 204 where it is waiting for Camera Changed Events 206 triggered by the user interaction devices. When a request for changing the selected camera is received, the local variable in the application that stores current camera information is updated 208, and the application goes back into the 'listen' mode, waiting for the next Camera Changed Event.

Figure 6:
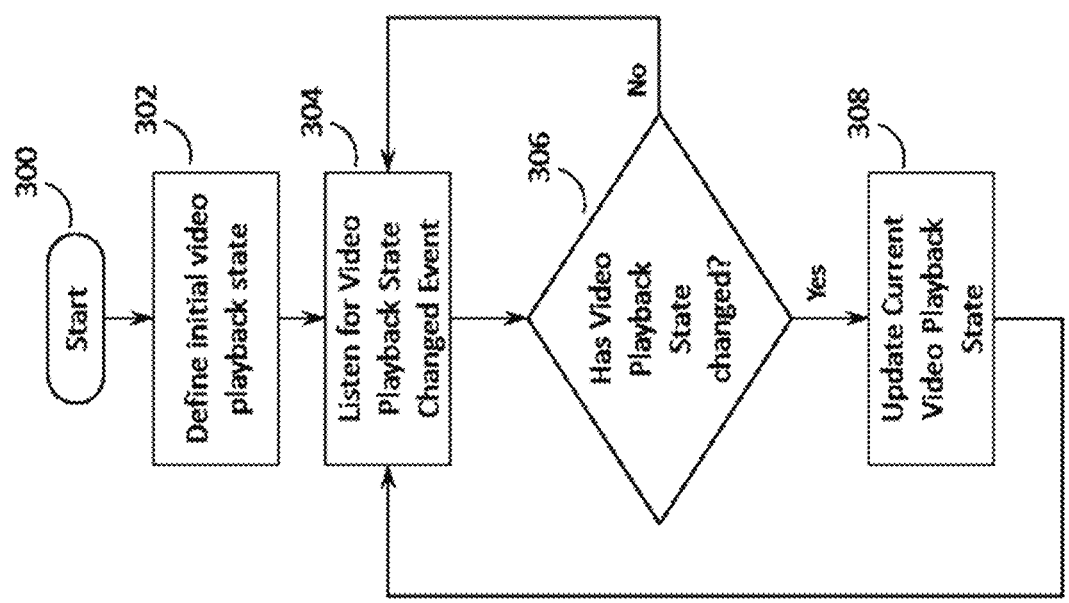
FIG. 6 is an embodiment of the steps involved in handling the Video Playback State Changed Event triggered by the user from start 300.

FIG. 6 shows the steps involved in handling the Video Playback State Changed Event triggered by the user from start 300. An initial video playback state 302 is used as the default to start with. Then the application goes into a 'listen' mode 304 where it is waiting for Video Playback State Changed Events 306 triggered by the user interaction devices. When a request for changing the video playback state is received, the local variable in the application that stores the current video playback state is updated 308, and the application goes back in the 'listen' mode, waiting for the next Video Playback State Changed event.

Figure 7:
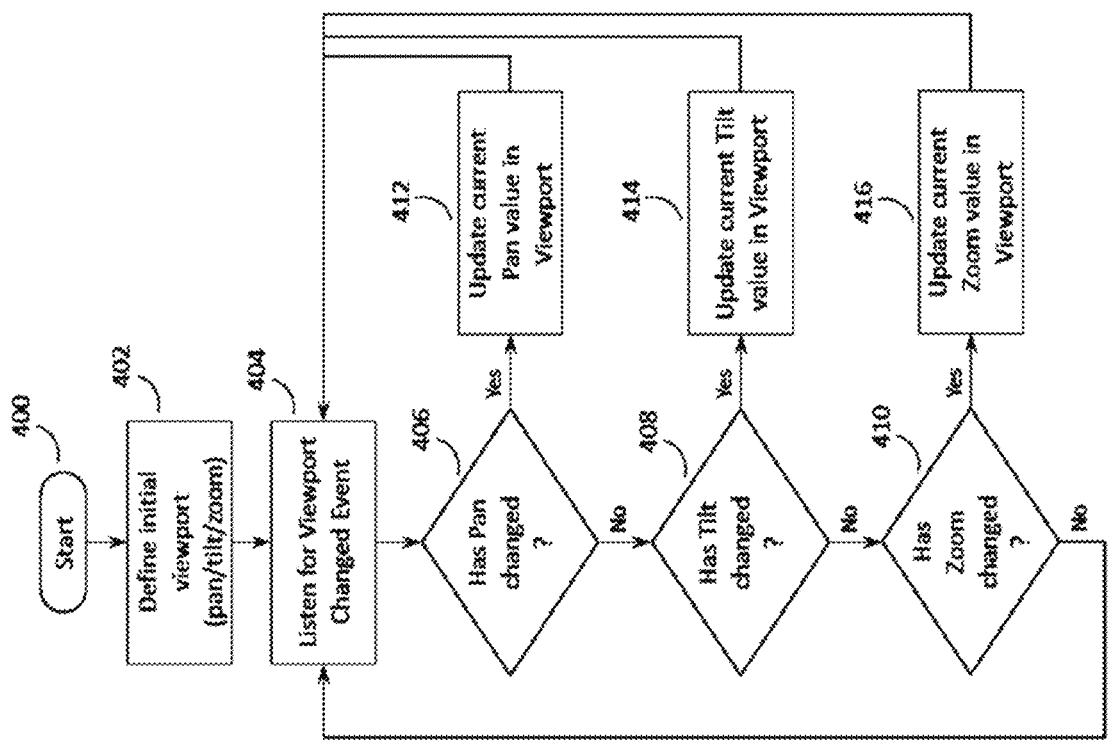
FIG. 7 is an embodiment of the steps involved in handling the Viewport Changed Event triggered by the user from start 400.

FIG. 7 shows the steps involved in handling the Viewport Changed Event triggered by the user from start 400. The viewport could be changed by changing the zoom, tilt, or pan. An initial zoom, tilt, and pan is used as a default 402 to start with. Then the application goes into a 'listen' mode 404 where it is waiting for Viewport Changed Events triggered by the user interaction devices. When a request for changing the viewport is received, the application checks to see if the zoom 410, pan 406, or tilt 408 value has been changes, and updates the local variables 416, 412 and 414, respectively in the application that store the zoom, pan, and tilt. The application then goes back in the 'listen' mode, waiting for the next Viewport Changed Event.

FIGS. 8a and 8b show how the Transport Control Events are handled by the viewing application initiated at start 500. The application is listening for Transport Control Changed Events 502. The application checks to see if the velocity of transport control was changed 504. If the velocity was changed, the value of the velocity stored within the application is updated 518 and the application goes back to listening for Transport Control Changed Events. If velocity has not changed, then the application checks to see if the user has requested to "Transport to Start" 506 so that they view the start of the buffered video stream in memory. If "Transport to Start" was requested, the value of the current timestamp to display is changed to be the same as the timestamp of the frame at the start of the buffer in memory 520, and the application goes back to listening for Transport Control Changed Events. If "Transport to Start" was not requested, then the application determines the current timestamp to be used for display based on playback state that the application is in. If the application is in "Play" state 508, then the current timestamp is incremented to the next timestamp 522. If the application is in the "Pause" state 520, then the current timestamp is not changed 524. If the application is in the "Fast Forward" 512 or "Rewind" state 514, then the current timestamp is incremented 526 or decremented 528 taking the frame rate and velocity of transport into account. If the application is in the "Live" state 516, then the current timestamp is set to the timestamp of the frame at the end of buffered frames in memory 530.

Figure 9:
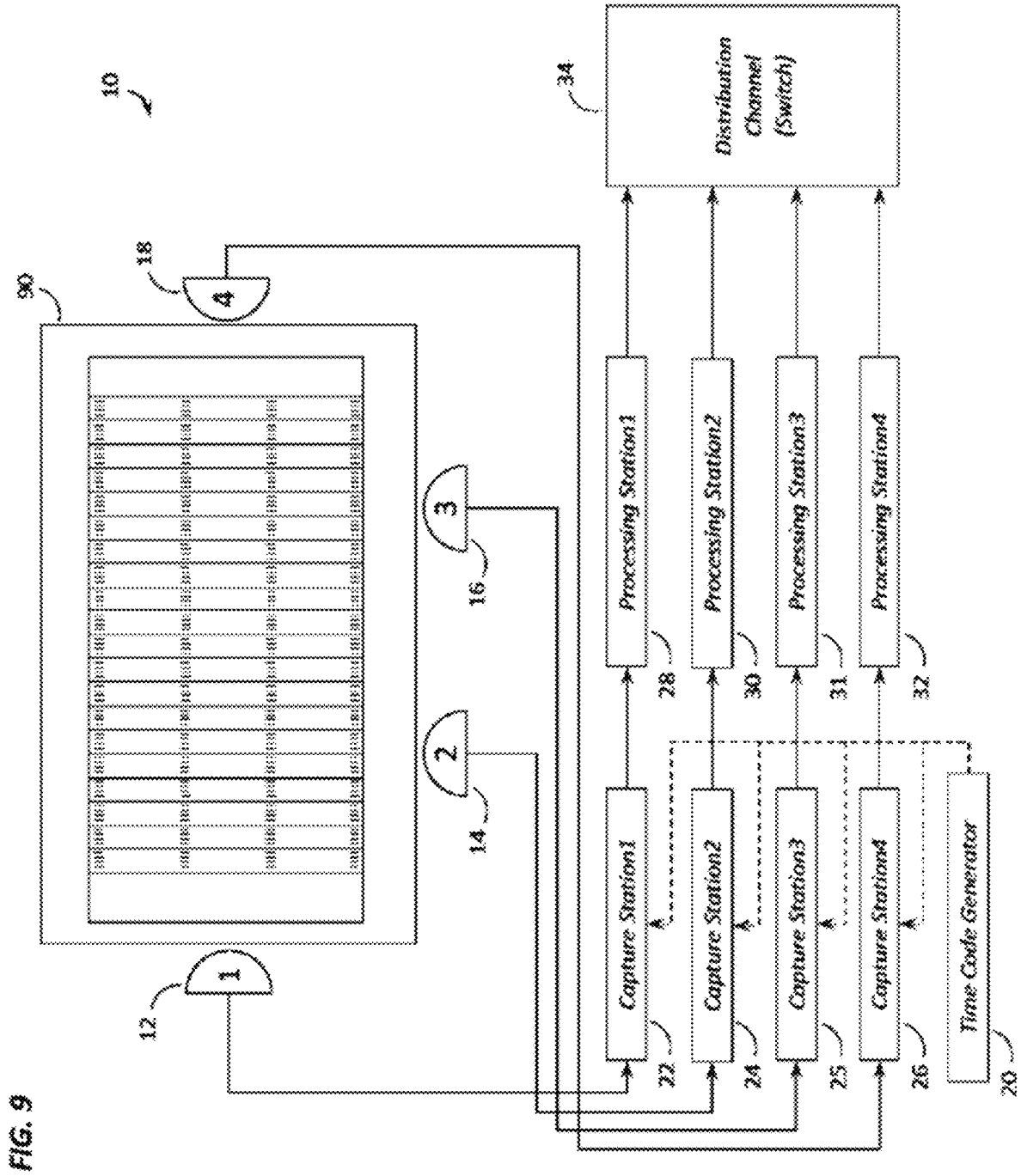
FIG. 9 is an embodiment of a football field 90 as the event location where multiple panoramic cameras 12, 14, 16 and 18 are located at strategic locations such that they provide different angles to view a sporting event from and allow one or more end-users to choose the angle that is best suited (for them) for viewing the event at any given point in time.

FIG. 9 shows a football field 90 as the event location where multiple panoramic cameras 12, 14, 16 and 18 are located at strategic locations such that they provide different angles to view a sporting event from and allow one or more end-users to choose the angle that is best suited (for them) for viewing the event at any given point in time. Each of the panoramic video cameras 12, 14,16 and 18 is connected to a capture station 22, 24, 25 and 26, respectively. Each capture station 22, 24, 25 and 26 receives a time-code from a time-code generator, and the time-stamp from the time-code is attached to the frames received from the panoramic video camera. The frames are then transmitted to the processing stations 28, 30, 31 and 32 where they are processed and streamed out to the distribution channel 34. Distribution channel 34 receives the frames and communicates the frames over a network to multiple clients that are connected to the distribution channel.

A panoramic video capture device as used herein comprises multiple sensors placed in a circular array such that a portion of image captured by each sensor overlaps with a portion of image captured by adjacent sensors. The overlapping images from the different sensors are captured synchronously based on a trigger mechanism, and these overlapping images form the basis for creation of a single, seamless panoramic image.

As used herein, a processor is a high-performance server-grade machine housing multiple graphic processing units (GPUs). A GPU is capable of performing large number of operations in parallel. The use of multiple GPUs in the processor allows for highly parallelized computations on multiple image frames being communicated by the panoramic video capture device. Memory can also be resident.

A processor comprises the following modules. First, a capture module is responsible for triggering the panoramic video capture device and retrieving the image frames once the exposure of the frame is complete. In certain embodiments of the capture module, the triggering of the sensors is not performed by this module. There is a separate trigger mechanism for the sensors and the capture module is notified of the event every time a new image frame is available on the panoramic video capture device. When this notification is received by the capture module, it retrieves the image frame from the panoramic video capture device.

As used herein, a processing module is operative to receive the raw frame from the capture module and applies the following filters to the raw frame: Demosaicing filter: In this filter, a full color image is reconstructed using the incomplete color samples from the raw image frames. Coloring filter: The full color image output from the demosaicing filter is then converted to appropriate color space (for example, RGB) for use in downstream modules. Seam blending filter: Colored images output from the coloring filter are used for blending the seam using stitching algorithms on the overlap between adjacent images.

As used herein a splicing module is responsible for using the images output from the processing module, and putting them together with the ends lined up against each other in such that the aggregate of these individual images creates one panoramic image.

Also as used herein, a slicing module takes the seam blended panoramic image, and splits this image into multiple slices. This is done so that each slice of the panoramic image can be distributed over the network in an optimized fashion. This overcomes the existing limitations of certain network protocols that cannot communicate panoramic images above a certain size of the image.

As used herein, a time stamp module listens for the time code from the time code generator. This time stamp is then attached to each slice of the image sections output from the slicing module.

As used herein, a compression module takes the image frame output by the time stamp module and compresses it using certain image compression techniques (JPEG, H.264, etc.) for transmission of over the network.

As used herein, a distribution device is a kind of router or switch that is used for transmitting the compressed frames over the network. Multiple clients could connect to the distribution device and receive the image frames being transmitted. In addition to this, subsequent distribution devices themselves could be connected to a distribution device transmitting the images for relaying the images over a wide network.

As used herein a client process processes the combination of sub-processes and modules on a viewer's machine to receiving image frames from a distribution device, store them in buffer, manage the user input from the user interaction devices, and display the video images to the end-user.

The client process is broken down into the following modules:

A receiving module which connects to the source of the video images via the distribution device, receives the images over the network, and stores them in a buffer on the viewer's machine.

A user interface module is used for managing the user input from the user interaction devices. In one of the implementations of the user interface module, the joystick controller is used for capturing the user input. The user input could be provided using buttons on the joystick or using the multiple thumb pad controls on the joystick. Different buttons are used to track the video playback state change input for play, pause, fast forward, rewind, or live mode A thumb pad control is used to track the viewport change inputs for zoom, pan, tilt of the view Another thumb pad control is used to track the transport control input for jogging forward or back based on the velocity of jog determined by how far the thumb pad control has been pushed.

A display module is used for displaying portion of the panoramic video frames to the user. The portion of the video frame to be displayed is determined based on the inputs from the user interface module. Image frame from the buffer is fetched and based on the other user inputs, the portion of the panoramic image to be displayed is determined. This portion is then displayed to the end-user for viewing.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

System and Apparatus for User Controlled Virtual Camera for Volumetric Video

The embodiments of the invention allow a user to interactively control their view and experience of an actual event in a volumetric space. The viewing can be imported or streamed to a VR head-mounted device with 6DOF or on mobile devices such as iPhone or Samsung Galaxy devices. With the embedded sensors of these devices, a user can select a vantage point within the volumetric space as the event is being played back in virtual space. This kind of user interactivity with video content in a volumetric space supports an array of innovative and new usages. For example, the user is provided with the ability to interact with objects in virtual space realistically, control the playback of streamed content, choose the best starting view to begin navigation, view additional player statistics, enjoy ambient audio from virtual speakers, and customize the experience of what one can see and hear in a live sporting event. These embodiments elevate the sporting event viewing experience to a new level.

In one embodiment, original event data is captured by cameras and microphones. The original event is converted to point cloud data (e.g., a set of data points in 3D space) and imported into a virtual reality head-mounted display with six degrees of freedom (6DOF). Note, however, that the embodiments of the invention may be implemented on various other types of head mounted/mobile devices. One embodiment of the invention allows the interactive movement of the user within the volumetric space as the event is rendered in the virtual space around them. The user may select their own vantage point either by physical movement or by "jumping" across longer distances via a cursor rendered on the field (or other region of the sporting event) displayed within the virtual environment.

In one embodiment, the point cloud data used for the volumetric environment is generated from a plurality of cameras distributed throughout the event (e.g., 30, 35, or more cameras). In one embodiment, the point cloud data is streamed to a client-side application which renders the environment. Alternatively, or in addition, the rendering may be performed on a server in response to control signals received from the client and the resulting video stream may be streamed to the client. In one implementation, the client-side application includes a graphical user interface overlay with a full suite of time controls. It may be rendered either live in real time or played on demand from recorded data later.

Certain aspects of the panoramic VR broadcast system described above may be used to capture, compress and distribute audio/video content for generating and managing the point cloud data as described below. However, the underlying principles of the invention are not limited to these specific details and, in fact, some aspects of the above-described systems are not used in the below implementations.

The screenshots illustrated in this application comprise results generated from an actual implementation of one embodiment of the invention (a football play). The stadium shown is generated from a pre-rendered 3D model used to improve aesthetic context.

Figure 10:
FIG. 10 is an embodiment which illustrates a point in time shortly after the beginning of a play in a football game from a location behind the offense.

FIG. 10 illustrates a point in time shortly after the beginning of a play in a football game from a location behind the offense. Note that in FIG. 10, a cursor 1001 is rendered near the right foot of the offensive lineman wearing #60. In one embodiment, the cursor 1001 appears as a result of the user pointing the VR controls down at the field, and indicates a point at which the user's view may be moved so that the user may view the event from this location (e.g., from the perspective of lineman #60). When clicking on the controls, the camera will be moved to this point, where the user may resume looking around as the event sequence continues. In this example, the cursor displayed may be positioned anywhere on the football field, the sidelines, or the stands.

Figure 11:
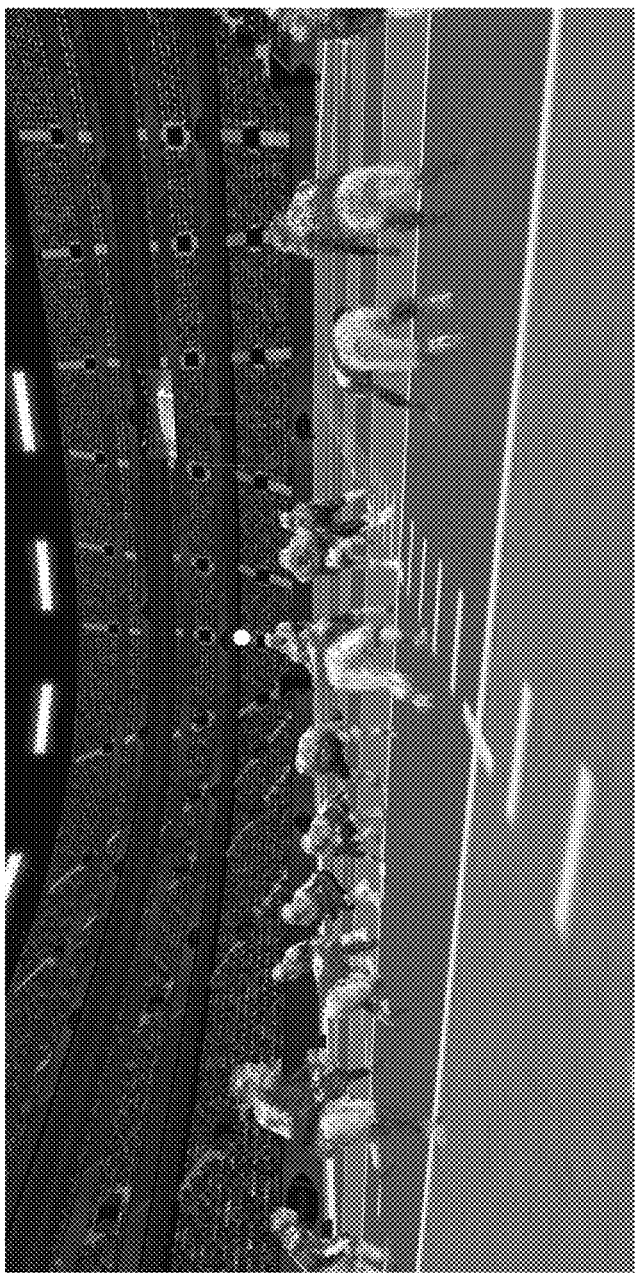
FIG. 11 is an embodiment of the starting point from behind the defensive line at the beginning of the play.

FIG. 11 illustrates the starting point from behind the defensive line at the beginning of the play. By manipulating an input device or performing a particular motion within the virtual environment, the user can jump between the offensive starting point (FIG. 10) and the defensive starting point (FIG. 11).

Note that FIG. 11 depicts an example where the start location of the user's viewing point is set to have the best viewing experience at the start of the sequence. This starting location gives the user the opportunity to view the most action by placing them in a location where they are most likely to see the most action—in this case behind the defensive line. The user controlled virtual camera experience can be created from either a system that captures and creates Point Cloud Data (PCD) for a live event or from a storage endpoint that has the data available for on-demand access. For a compelling immersive experience, the embodiments of the invention capture and provides immersive video and audio content, enabling a combined visual and audio 6DOF experience.

Figure 12A:
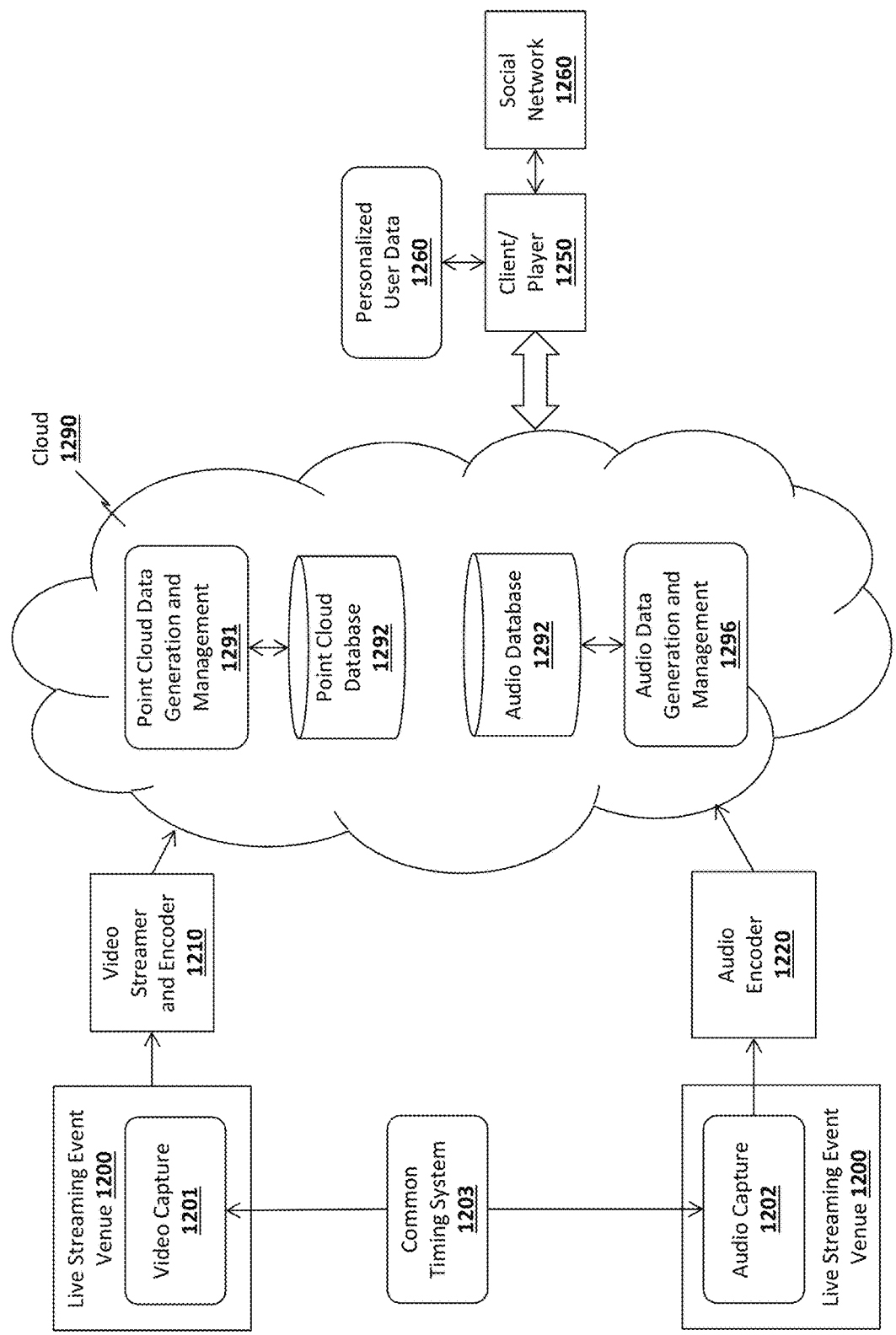
FIGS. 12A-B is an embodiment of A system in accordance with one embodiment of the invention is illustrated.
Figure 12B:
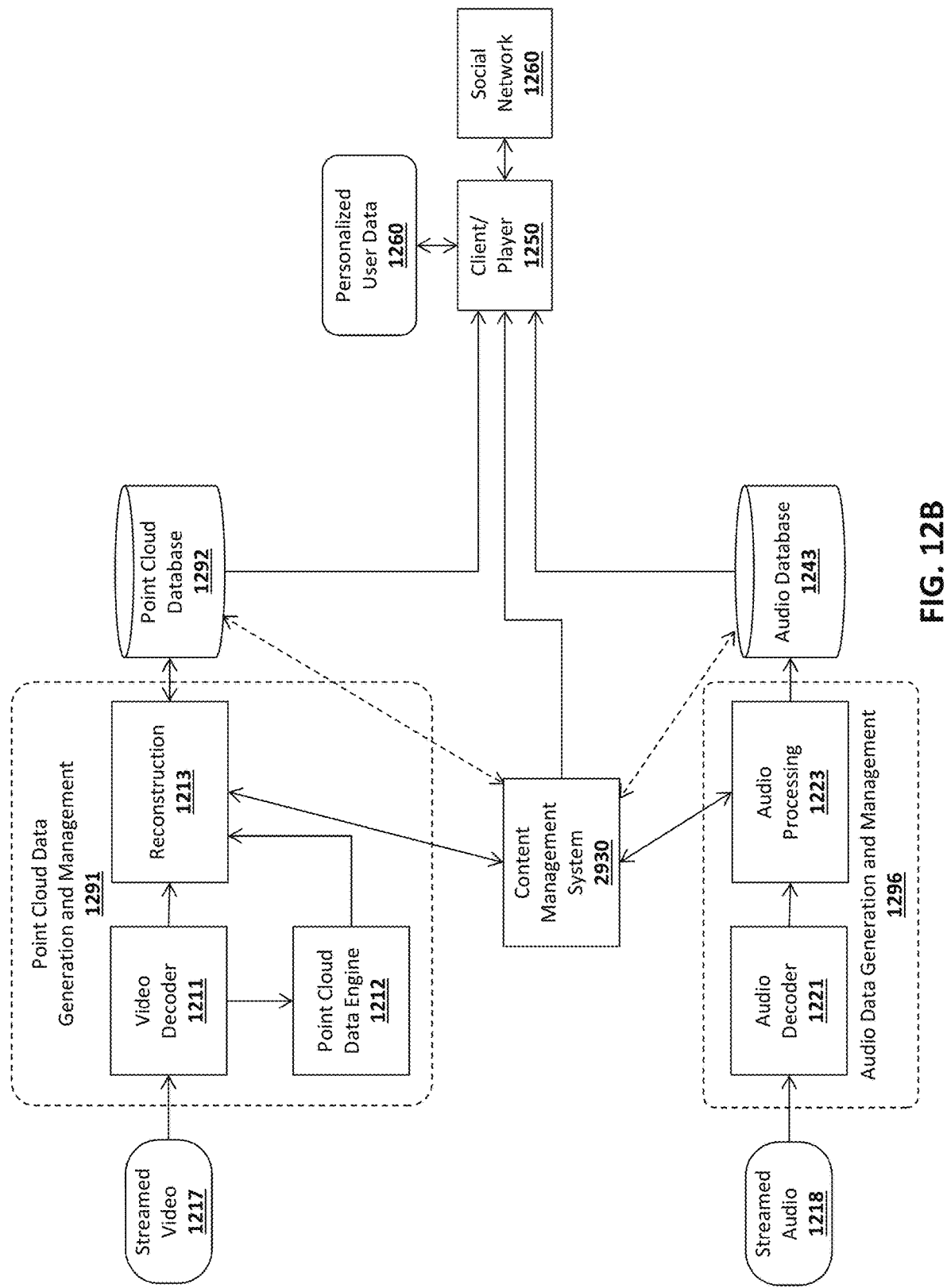

A system in accordance with one embodiment of the invention is illustrated in FIGS. 12A-B. By way of an overview, a video capture system 1201 comprising a plurality of cameras (e.g., 30, 40, 60 cameras, etc) coupled to a video streamer and encoder 1210 are strategically positioned at different locations at an event venue (e.g., a sporting event). The cameras of the video capture system 1201 capture sequences of images and transmit those sequences to the video streamer and encoder 1210 which compresses and streams the video to cloud service 1290. In one embodiment, the video is encoded with H.264 with embedded timestamps (described below) and is transmitted in accordance with the RTP/RTCP protocol or a reliable transport over TCP.

An audio capture system 1202 comprising a plurality of microphones coupled to an audio encoder 1220 are also distributed throughout the event venue 1200 to capture audio from different perspectives. The microphones capture raw audio (e.g., PCM data) which the audio encoder encodes/compresses and streams to the cloud service 1290 (e.g., via Opus/RTP with timestamps).

In the illustrated embodiment, a common timing system 1203 is coupled to both the video capture system 1201 and audio capture system 1202 to ensure that the video frames captured by the video capture system 1201 and audio captured by the audio capture system 1202 can be synchronized during playback. In one embodiment, the video capture system 1201 stamps each video frame and/or packet (or every Nth frame/packet) with a timestamp provided by the common timing system 1203. Similarly, the audio capture system 1202 stamps each audio packet (or every Nth packet) with the timestamp.

The video streamer and encoder 1210 encodes/compresses the video and streams the video to the cloud service 1290 which includes a point cloud data generation and management system 1291 comprising circuitry and logic to generate point cloud data (as described herein). A point cloud database 1292 stores the point cloud data and provides the point cloud data to requesting clients/players 1250 under the control of a user. For example, the user may specify a particular location from which to view the event. In response, the corresponding point cloud data is streamed to the client/player 1250 for viewing by the user.

Similarly, audio data generation and management system 1296 within the cloud service 1290 decodes and stores the audio content within an audio database 1292. In response to a user request to view a particular portion of an event from a particular location on the field or the stands, the corresponding audio data is streamed to the client/player 1250, which synchronizes the video and audio streams using the timestamps, renders the video, and reproduces the audio for the user.

FIG. 12B illustrates additional details of one embodiment of the invention including a content management system 2930 for managing access to the data in the point cloud database 1292 and audio database 1243 as described below. A video decoder 1211 decodes the compressed video stream (e.g., using H./264 decoding) and provides the decoded video frames to a point cloud data engine 2912 and a reconstruction engine 1213. One embodiment of the point cloud data engine 2912 includes image analysis/recognition circuitry and software for identifying particular objects or groups of objects within each of the video frames such as particular players, each team, the ball, and different play views. Machine learning or other image recognition techniques may be implemented by the point cloud data engine 2912 to "learn" to identify different objects in different types of events.

Once the objects are identified, the coordinates for the objects are provided to the reconstruction engine 1213, which generates point cloud data files with timestamps (e.g., .pcd files, .ply files). It then stores the point cloud data files within the point cloud database 1292.

An audio decoder 1221 decodes the streamed audio 1218 to extract the timestamps (e.g., using AAC or other audio compression/decompression techniques) which it provides to audio processing circuitry/logic 1223. The audio processing circuitry/logic 1223 then stores the audio and timestamps to the audio database 1243 (e.g., streaming the audio data using Opus/RTP or other protocol).

In one embodiment, the content management system 2930 manages the storage of the point cloud data in the point cloud database 1292 and the audio data in the audio database 1243. For example, the content management system 2930 establishes HTTP/REST sessions with the reconstruction engine 1213 and/or point cloud database 1292 to manage/track storage of the point cloud data. Similarly, it establishes HTTP/REST sessions with the audio processing circuitry/logic 1223 and/or audio database 1243 to manage/track the audio data.

In response to a client request to view a particular event at a particular location on the field/stands at a particular point in time, the request is redirected to the content management system 2930 which provides metadata to the client 1250 (e.g., via HTTP/REST). In addition to providing the client 1250 with links to the point cloud data in the point cloud database 1292 and the audio data in the audio database 1243, the content management system 2930 may also provide relevant metadata related to the event, such as player and team statistics and the current score. The client 1250 then requests the point cloud data from the point cloud database 1292 and the corresponding audio from the audio database 1243. In addition, the GUI of the client 1250 may interpret the metadata and display it within the virtual event environment.

The following additional details may be included within each of the following system components:

Live Streaming Event Venue 1200

This is a source location that has video and audio capturing capability via physical cameras and microphones installed and operated at the venue location. The video cameras 1201 may distributed strategically throughout the event venue 1200 and may be statically positioned and/or operated on dynamically adjustable devices such as moving platforms or video capturing drones. The microphones 1202, similarly may be physically positioned surrounding the venue to capture the sound of the event from different orientations.

Common Timestamping Source 1203

Assuming that content is captured by different systems for video and audio sources, a common clock/time source 1203 timestamps the captured video frames and corresponding audio samples. The timestamp indicates the time at which the content was captured and is subsequently used by the client 1250 to synchronize the content from these sources.

Video and Audio Encoding

Captured video and audio data in an uncompressed raw format is not suitable for a bandwidth-constrained data transport such as delivery over an IP network. In order to move the content to a remote location for the next stage of processing, the video can be compressed and encoded to a suitable format for data transport and processing. Thus, in FIG. 12, video encoding circuitry/logic 1210 compresses and encodes the raw video and audio encoding circuitry/logic 1220 compresses and encodes the raw audio content for transmission over a network communication channel.

Video Decoding 1211 and Audio Decoding 1221

The transported and compressed video and audio data are received by video decoding circuitry/logic 1211 and audio decoding circuitry/logic 1221, respectively, which decompress the video and audio, respectively. The decoding circuitry/logic 1221, 1211 comprise endpoints that handle packet/data loss and any packet transport reliability requirements. The received content is decoded and may be transformed into a suitable format for the next stage of processing. In particular, the decoded video is provided to a reconstruction engine 1213 and a point cloud data engine 1212 and the decoded audio is provided to an audio processor 1223, described below.

Reconstruction Engine 1213

During the stream processing stage, the reconstruction engine 1213 processes and converts the video streams to point cloud data 1241 stored on a point cloud data storage system 1242 (e.g., a Cloud service). The reconstruction engine 1213 performs a variety of point cloud operations including (but not limited to) i) cleaning of background images, ii) 2D localization operations, iii) 3D localization operations, iv) segmentation, and v) reconstruction.

The reconstruction engine 1213 also receives information from the Point Cloud Data Engine 1212 which runs in parallel and provides information related to the visual content in the video such as where a ball is located or a specific player. The reconstruction engine 1213 uses this information to generate and store additional metadata in the point cloud data which may be used to assist the client 1250 in identifying relevant or interesting content in the point cloud.

The Reconstruction engine 1213 also records or catalogs this information in the Content Management System 1230 which manages the content for the client 1250 to access from the Point Cloud Data storage system 1242. In particular, the content management system 1230 may record data used to identify interesting or otherwise relevant views for the user to access. The start and end of a particular view may be identified using the timestamps recorded within the point cloud data itself. In addition, the content management system 1230 manages metadata associated with the content and pointers to relevant portions of the point cloud data 1241 and audio data 1240. This metadata and pointers are provided to the client 1250 upon request to allow the user to choose desired content and a desired view. Upon selection, the client 1250 generates a request and the associated video content is streamed from the point cloud data and audio content from the audio data 1240.

Point Cloud Data Engine 1212

One embodiment of the Point Cloud Data Engine 1212 receives video streams as captured from the venue and runs computer vision algorithms to identify and track interesting or relevant content in the streams. It then provides data identifying the interesting/relevant content to the Reconstruction engine 1213. For example, the Point Cloud Data Engine 1212 can provide location information indicating where a ball or player is located in the current view. This data allows the Reconstruction engine 1213 to add metadata into the point cloud data 1241 indicating this location.

Content Management System 1230

One embodiment of the Content Management System 1230 catalogs and manages point cloud content that is available for the client 1250 to access or provides additional content to enhance the end-user experience. For example, player stats or other external information that is not directly recorded in the point cloud data 1241 can be retrieved as needed from the Content Management System 1230.

Point Cloud Data Storage System 1242

In a live system, the decoded video frames are transformed by the reconstruction engine 1213 to point cloud data 1241, along with the additional metadata (e.g., timestamps and tracking information) provided from the Point Cloud Data Engine 1212. All of this data is stored in the point cloud data storage system 1242. In one embodiment, the point cloud data 1242 is distributed redundantly across a plurality of servers in a Cloud service.

In one implementation, the video content is not actively written to storage during a live game but is stored from an earlier recorded event. For example, the data may be retrieved from an external Point Cloud Data source. The underlying principles of the invention are not limited to the temporal manner in which the video/audio data is processed and stored. The data must simply adhere to format and syntax requirements expected by the client 1250.

The point cloud data storage system 1242 may also provide data in a compressed format to deliver data more efficiently to bandwidth-constrained clients, such as mobile endpoints operating over wireless networks. In one embodiment, the point cloud data storage system 1242 stores the video content in a plurality of different bitrates and streams the bitrate most suitable for the client 1250 connection.

Audio Processor 1223

One embodiment of the Audio Processor 1223 processes the audio streams and, based on the physical location and orientation of the audio microphones 1202, it creates metadata comprising this location information which is associated with the relevant audio samples. The Audio Processor 1223 may also record or catalog this information in the Content Management System 1230 from which it may be accessed by the client 1250.

Knowledge of the physical location and orientation of microphones provides for a 6DOF audio experience when audio content is played based on the user's current viewing point within the point cloud data 1241.

Audio Data Storage 1243

The Audio Data storage 1243 is the storage endpoint for the audio samples accessed by the client. The content is cataloged in the Content Management System 1230 and is associated with relevant portions of the point cloud data 1241 via the common timestamps. Thus, when the user requests particular video content from a particular viewpoint, the video content is provided from the point cloud data storage 1242 and the associated audio data 1240 is provided from audio storage 1243. The client 1250 then uses the timestamps to synchronize the audio content and video content.

Client 1250

One embodiment of the Client 1250 renders the point cloud data 1241 to the user based on user control and actions. The client 1250 accesses the Content Management System 1230 to discover interesting views/plays available in the Point Cloud Data. These views may be presented to the user for selection. once selected, the Client 1250 accesses the Point Cloud Data 1241 based on this entry-point and/or starting time information.

The content that is accessed may be a live real-time stream or may be requested and retrieved on-demand from available stored data. As mentioned, the client 1250 also accesses the audio data 1240 which it discovers through a reference either from the Content Management System 1230 or through metadata stored within the Point Cloud Data 1241. While the point cloud data storage 1242 and audio data storage 1243 are illustrated separately in FIGS. 12A-B, the same Cloud storage service may be used to store both the audio data 1240 and point cloud data 1241.

A Personalized User Data component 1251 stores user preferences such as preferred team(s) and favorite players. In one embodiment, this information is used to identify specific content in the Content Management System 1230 (e.g., specific clips of the team(s)/players) or can be used directly when this information is available from the metadata associated with the point cloud data 1241.

In one embodiment, the client 1250 also connects with a Social Networking service 1260 to allow a user to post and share views with friends or other social groups.

Personalized User Data 1251

The Personalized User Data 1251 includes information related to a user's preferences when accessing content from the Point Cloud Data 1241. For example, when accessing an event calendar for sporting events, a user may prefer to access views from the perspective of a particular team or player. In one embodiment, this information is accessed by the Client 1250 which uses the information to discover available content via the Content Management System 1230. In addition, the information may be used to identify content directly in the point cloud data 1241 when such metadata is stored therein.

Social Network 1260

The Social Network 1260 may be any third party external network of which the user is a member. The Client 1250 may access these networks to share and post content from the Point Cloud Data or related information.

User-Customized Virtual Camera

In one embodiment, a navigable menu is provided that allows the user to choose from pre-selected virtual cameras positioned at vantage points that are most interesting. Each virtual camera comprises a unique angle and may be customized to an individual user. From this starting view, the user may access the controls at any time to reposition as they like. The initial position may be configured based on the user's preferences, either explicitly entered into a client application that is being used to view the sequences, or based upon their past behavior in watching other content. For instance, if the user either has explicitly declared a favorite team, or has a known history of watching a particular team more often, the client 1250 may place the user's initial viewing position from that team's side of the field.

In one embodiment, a group of users may be associated with the same scene at the same time in a socialized setting, with each user able to see an "avatar" of another user displayed in the scene so that they know what each user is looking at. Each user has full control over their position from which to observe the action in progress, and can change at any time. The boundaries of the area users may select from may be configured by the presenters prior to viewing by users; in this example, it was configured to be the full area of the football field, but could be set to also include aerial views over the players' heads, spectator views from within the seating in the stadium, inside a luxury box over the field, or any other position desired by the presenters. For instance, a user may wish to position themselves further down the field to watch the receiver as he is about to receive the ball.

Figure 13:
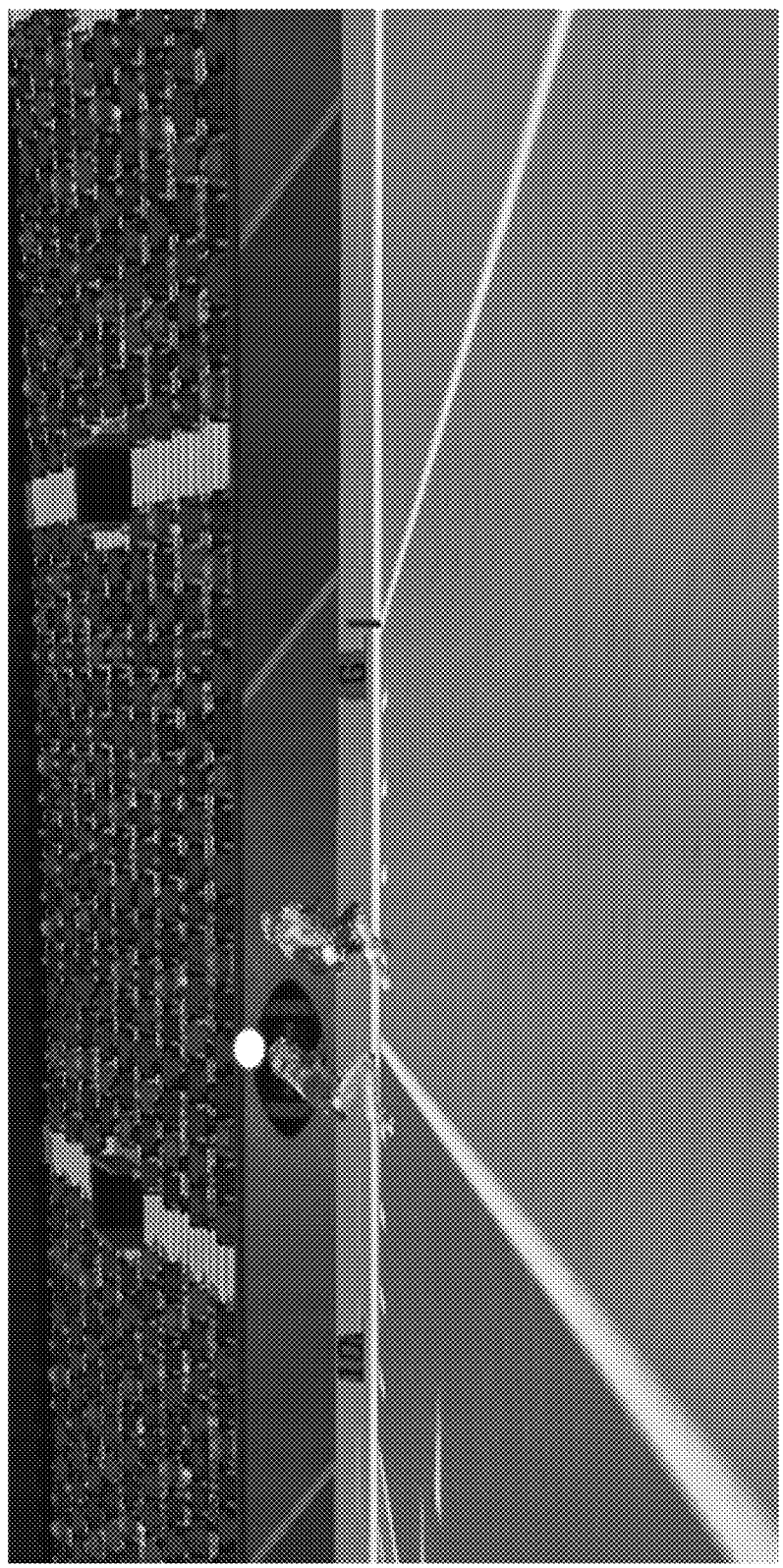
FIG. 13 is an embodiment of an example comprising a view of a receiver downfield.

FIG. 13 illustrates an example comprising a view of a receiver downfield. While this example is drawing upon a single play from football, there is no structural reason that it need be limited to this orientation.

Time Control of Volumetric Video Sequence

Figure 14A:
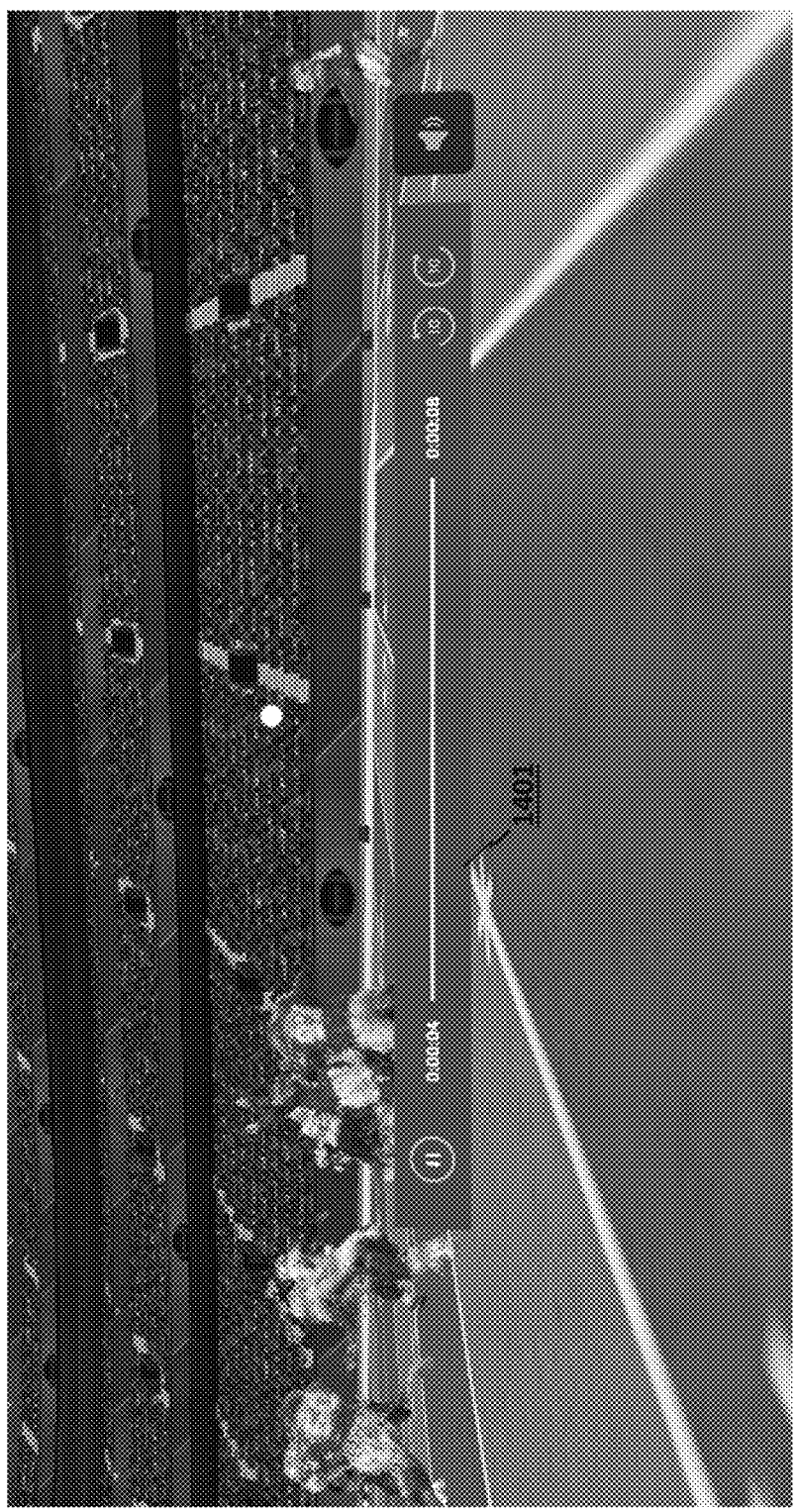
FIGS. 14A-B illustrate examples of supplemental data and control graphics used in different embodiments of the invention.
Figure 14B:

In one embodiment, the user is provided with control over the replay of the sequence. As shown in FIGS. 14A-B, at any time the user may provide input via an input device or motion to cause a user interface 1401 to be rendered. The user interface of this embodiment includes graphical video controls superimposed over the video content. The user may access these controls to pause, resume from pause, skip forward, or skip back in replay of the sequence.

These controls allow the user to stop the action at a particular point in time and continue to move about to re-examine the scene from different views within the field of interest. Controls for audio that may be edited into the scene, suggested camera angles, or any other additional elements of the overall experience may be included with this. There is no logical or structural limit on the possible vantage points; the given screenshots depict viewpoints as if the user were standing on the field, but views from overhead, from the stands, from a virtual "luxury box", or anywhere else within line of sight may be presented.

Tagging of Object of Interest

In addition, as illustrated in FIGS. 14A-B "tags" 1401A-C may be added to the scene to direct the user's eye to people or objects of interest. For example, the quarterback could have his name and jersey number drawn in text that follows his position around the field. The receiver who catches the pass, the defender who follows him down the field, and any other players instrumental to the sequence of events can also be tagged with metadata. The metadata may be stored and managed by the content management system as described above.

By viewing and/or accessing these tags 1401A-C, the user is provided with the ability to learn more about the team, the players, and/or the event. A virtual "telestrator" may also be added to the scene to provide an explanation as to how an event unfolded in the way that it did, and where people within it made good or bad decisions that contributed to the end result. This data may be personalized for each user (e.g., stored as personalized user data) so that different forms of metadata and graphics are provided to different users.

Markers for Best View

In one embodiment, two types of cameras are made available as presets for viewing by the user:

1. PCAM (Physical Camera): Cameras positioned in the venue physically. These may be static and/or dynamically movable in the venue. For example, static cameras may be pre-configured at locations around the venue while another set of cameras may be connected to camera positioning devices or held by camera workers and moved around the field during the event (e.g., coupled to adjustable wire systems above the field or on the sidelines).

2. VCAM (Virtual Camera): Virtual cameras are those which are pre-defined by the producer (e.g., using a production tool) who positions them in 3D space anywhere within the event venue. These can also be static cameras (that stay at the same spot in 3D space) or they may follow cameras that follow the ball or a specific player in 3D space using the tracking data ingested by the Point Cloud Engine 2912.

Because not all PCAM and VCAM deliver the same interesting view of actions and events happening in the field, one embodiment of the invention includes a view ranking engine (e.g., within the point cloud data engine 1212) which ranks all of the views based on the best viewing angles for action during the game and/or other interesting events on the field. A set of the highest ranked locations may be identified with graphical markers so a user can pick a view to start navigation. A user may also preview the view of each marker location by going around all available views and then make choice to lock down a view.

One embodiment of the view ranking engine starts with player and ball detection using a Computer Vision Technology (CVT) engine to segment out objects in their bounding boxes. Based on a deep learning training model for player and ball, one embodiment of the view ranking engine gives an inference for the best view for users.

Physics Engine for Objects in Volumetric Data

In one embodiment, the object segmentation for an object of interest in the volumetric data processed and generated by the point cloud data engine 1212 is used to create the bounding box for the object itself. The bounding box of an object is used to realistically give a presence of the object itself in the field of the event venue. In one embodiment, each VCAM also has a bounding box to mark its presence in the field such that the view of the VCAM bounces away from the bounding box of object when it bumps into the object This solves a problem which can result if the view of a VCAM passes through an object. Moreover, the bounce-back is animated using a physics modeling engine to give a more realistic user experience.

The bounding box may be provide to both augmented and real objects in the field, and invisible barriers may be added around the stadium to constrain where a virtual camera can move, similar to what a person can do in the real-world.

Volumetric Augmentation

Volumetric augmentation is the insertion of visual elements into point cloud data, for display on HMD (Head Mounted Display), or mobile devices. Augmentation of the content allows for the insertion of various visual elements (examples of which are described herein) that allow for deeper storytelling that enhances the volumetric viewing experience. These augmentations can either be "in-perspective" 3D elements, or 2D "screen space" UI elements. Volumetric augmentation can also include 3D data visualizations of external data feeds, that are inserted into the point cloud. Examples of these volumetric augmentations include (1) Identifier Graphics (In-perspective), and (2) Identifier Graphics (2D screen-space UI).

Identifier Graphics (In-Perspective)

Identifier graphics are the in-perspective pointers, and other visual elements that give relevant contextual information about an object in the 3D scene. Examples of these identifier graphics include:

a) pointers above objects,
b) content selection disks under object,
c) object trails,
d) volumetric highlights,
e) 3D sponsorship graphic inserts, and
f) 3D telestration.

In-Perspective augmentation can be both stationary, or track an object over time within the scene. For example, fan insights may be provided into tactically interesting situations. In this embodiment, multiple users may be watching the game in the volumetric space, analyzing the game flow and discussing the important situation of the game using the 3D telestration tools. This will enable user to draw 3D effects and graphics on the live video.

Figure 15:
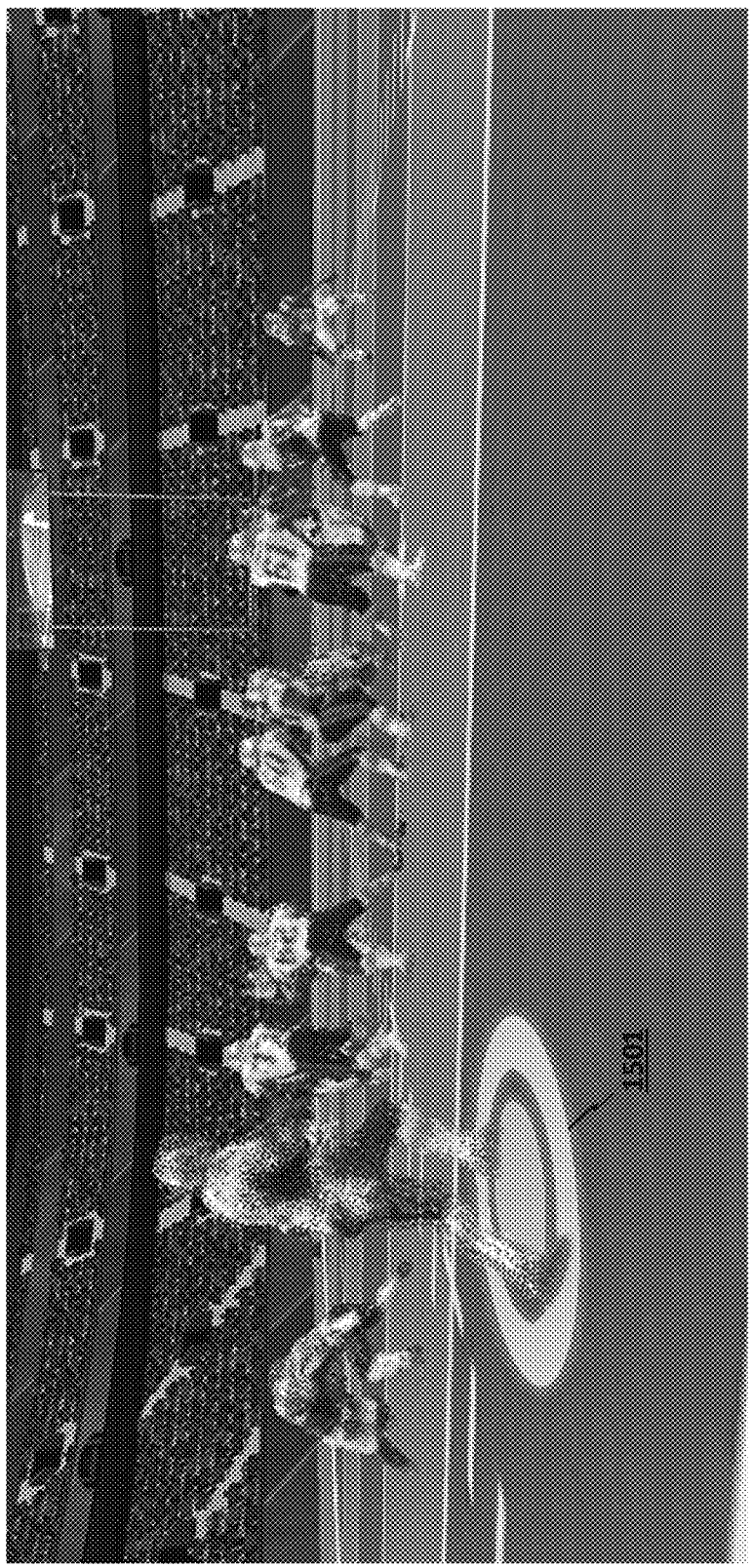
FIG. 15 is an embodiment of another example of in-perspective augmentation is the content selection disk.
Figure 16:
FIG. 16 is an embodiment of which shows in perspective volumetric highlights of two players.

The player info tags 1401A-C shown in FIGS. 14A-B are one example of in-perspective object identifier graphics. Another example of in-perspective augmentation is the content selection disk 1501 illustrated in FIG. 15. Yet another example is shown in FIG. 16, which shows in perspective volumetric highlights 1601A-B of two players.

Identifier Graphics (2D screen-space UI)

Figure 17:
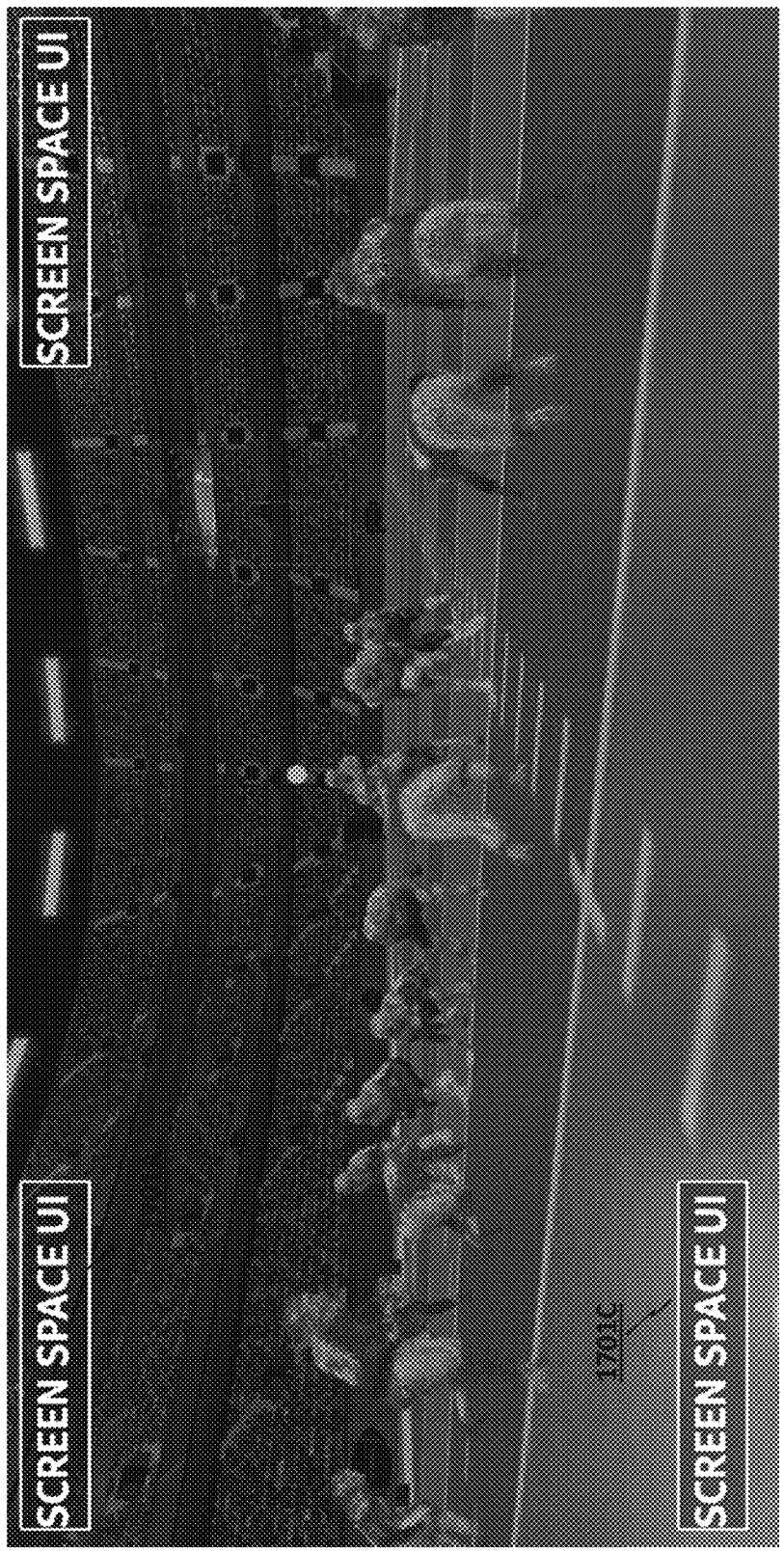
FIG. 17 is an embodiment of a 2D Screen Space UI comprising 2D UI graphic elements.

Identifier graphics are the 2D visual user interface elements displayed on a device's screen which provide relevant contextual information about an object (e.g., a player, team, etc). Examples of these identifiers include HUDs (Heads up Displays) of content derived from the volumetric point cloud, such as position, speed or location. FIG. 17 illustrates an example 2D Screen Space UI comprising 2D UI graphic elements 1701A-C rendered on top of the images on the device's screen.

Volumetric Spatial Points of Interest

Volumetric spatial points of interest, generated in one embodiment, comprise multiple 3D audio points of interest within the volumetric point cloud for playback on a HMD, or mobile device. These various points of interest allow the user to experience contextual audio from different points of view, allowing for deeper immersion within the content.

These areas of interest are represented in one embodiment as 3D volumetric audio spheres captured within the point cloud.

An example of a volumetric spatial point of interest includes context specific audio. For example, in a football game, a user is provided with the ability to switch between the audio of a quarterback and wide receiver in a point cloud, and hear unique audio from the point of view of the quarterback or wide receiver, respectively. When a user selects a different point of interest, the audio transitions in sync with the 3D point cloud render.

Crowdsourcing Collaborative Control

Crowdsourcing collaborative control is the ability for vantage points from within a volumetric experience to be sourced from individuals or from a group with a shared common interest, for HMD and mobile devices. These preferred volumetric vantage points can be gathered from users' data analytics or given by the user themselves, and provides users with the ability to curate their own volumetric experience of an actual real-word event. Since a piece of volumetric content can viewed from many more angles than a standard stationary camera, the system takes the most relevant data to provide users their best preferred vantage point. An individual is also provided the ability to share their personalized volumetric experience of an event with other users or experience others' shared vantage points. To identify these crowdsourced volumetric content vantage points, one or a combination of the following techniques may be used:

A. Voting Best Volumetric Viewing Angles
B. Personalized Volumetric Viewing Vantage Points
C. Augmenting Users' Sourced Data Analytics into a Volumetric Experience
D. Share Own and View Individuals' Volumetric Experience
E. Share Your Reactions within Volumetric Space These capabilities provide individuals the tools to have a personalized storytelling experience of an actual 'real-world' event. The storytelling of the experience is left to the user to decide when they would like to take an active or passive role in their experience. By structuring a system that incorporates as many or as little recommendations of vantage points to experience a 'real-world' event from a different perspective. The ability to transverse an actual 6DoF event, whether it's live or post-production, provides users many options for vantage points from which to experience the volumetric content.

Voting Best Volumetric Viewing Angles

Groups of users can collective come together to decide the best volumetric vantage point. These vantage points can also be sub-communities of the larger community to tailor a more preferred volumetric viewing vantage point that aligns more strongly with the preferences of the sub-community.

This functionality can also extend to allow sub-communities the capability to collectively challenge other sub-communities on where the best volumetric content vantage viewing point is located.

Figure 18:
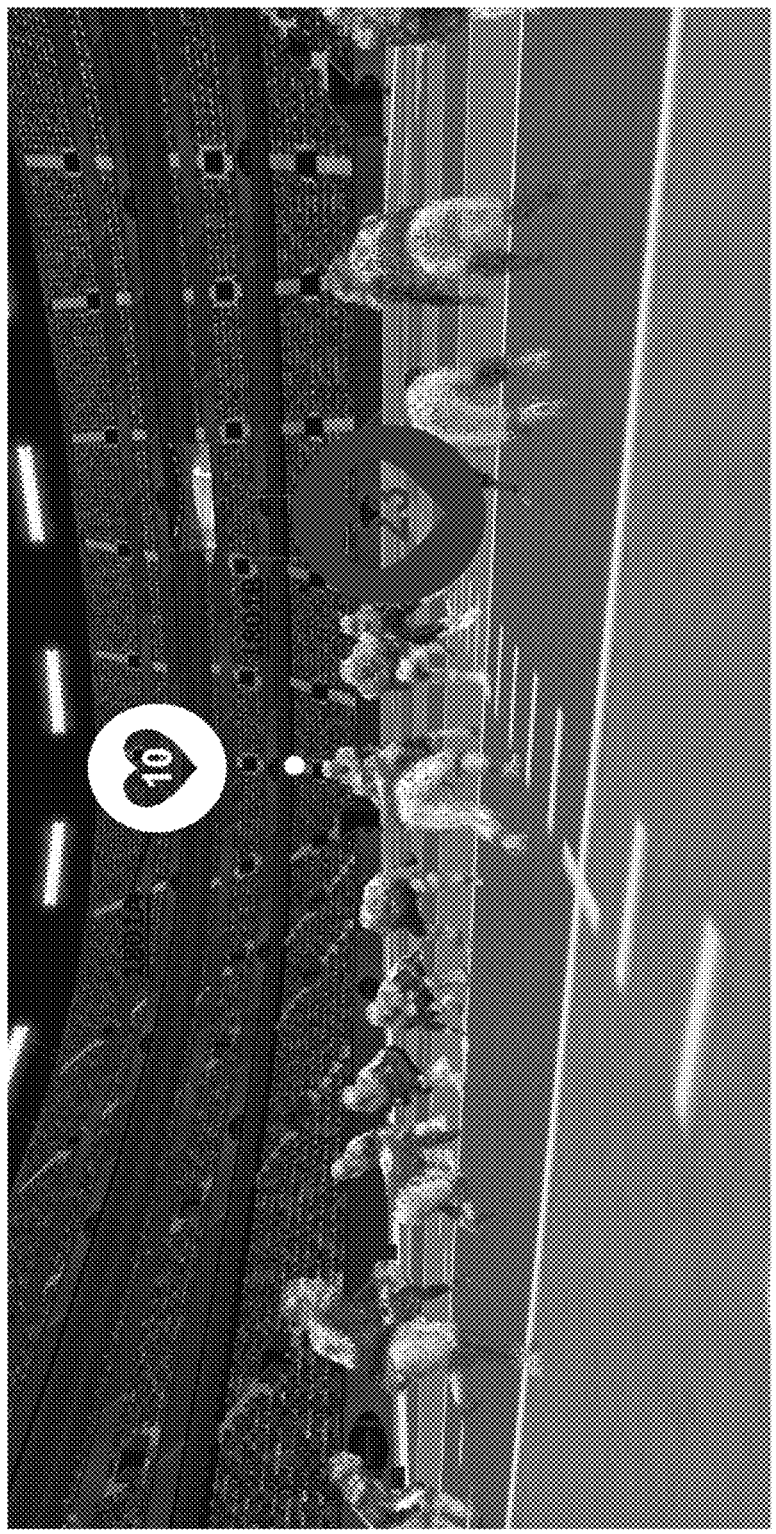
FIG. 18 is an embodiment of graphic elements showing the results of crowd sourced voting on different camera viewing vantage points.

FIG. 18 illustrates graphic elements 1801A-B showing the results of crowd sourced voting on different camera viewing vantage points. Graphic element 1801A indicates that 10 users have voted for the perspective of the quarterback while 1801B indicates that 23 users have voted for the perspective of the defensive tackle.

Personalized Volumetric Viewing Vantage Points

A tailored personalized volumetric viewing vantage point can also be derived from a user's pre-experience, during experience, and past-experience preferences. Pre-experience vantage angles can be sourced from user preference data that is relevant to an individual user. This vantages angels are identified by either or a combination of voluntary asked preferences or information universally available about the individual user.

During-experience vantage angles takes into consideration where and how an individual is currently interacting with a piece of 'real-world' volumetric content. These relevant pieces of information as in where to user is located, what the user is looking at, and how the user is consuming the content are taken into consideration in determining a vantage point for the user.

Example 1: Where the User is Located

If a user has preference to an experience of Type A, but they are currently located in a spot that better suits those with preference of Type B.

The user will be indicated by either a visual or auditory cue to receive feedback that a more preferred vantage angle is available that closer aligns with their preferences.

Example 2: What is in a User's Field of View (FOV)

By tracking what is in a User's current FOV, the system can determine whether a user is looking at a vantage point that does or does not align with their content preferences.

The system is able to indicate to the user whether their current FOV is their preferred or there is a more preferred vantage angle available.

Example 3: How the User Consumes Volumetric Content

Being able to know if a user is sitting or standing gives height information about that user. The type of medium the user consumes volumetric content also adds an extra layer of vantage points that better suit mobile versus HMD experiences.

To enhance presence a user's pre-setup consuming preferences and during experience physical interactions determine preferred vantage points. This systems takes how a user is physical setup in the 'real-world' to affect their preferred vantage points in the volumetric world.

To determine a user's personalized vantage points clustering uses these labels to detect similarities in user's pre-experience, during-experience, and past-experience interactions to weight a user's preferred vantage point.

Example 4: Where is the User Looking (Real Time Eye/Head Tracking)

One embodiment of the invention takes advantage of eye or head tracking performed by the user's VR headset. This embodiment adds a sense of automation to camera selection in the experience where the camera moves/pivots to a location based on the current direction of the user's gaze. For example, if the user is looking at the right edge of the screen, the system rotates the camera to the right based on tracking of the user's eyes.

The same idea can be expanded to the concept of head tracking. Current VR systems can detect head movement. This data can be used for predictive analysis to switch cameras or move the user to a specific location in 3D space. For example, when a user is at the center of the field looking at a play but has been continuously looking at the right side, then one embodiment of the invention moves the user closer to that space or switches to a camera being offered near that space to automatically allow the user to see things closer to that space. It is assumed that either of the above two examples would not be enforced on the user but would rather be toggleable features that can be turned on or off as needed.

Augmenting User-Sourced Data Analytics into a Volumetric Experience

Data analytics can be gathered from a group of users or a derived sub-group of a larger group to provide feedback to a user within the volumetric experience on how a group or sub-group is interacting with the volumetric content through audio and visual cues.

Figure 19:
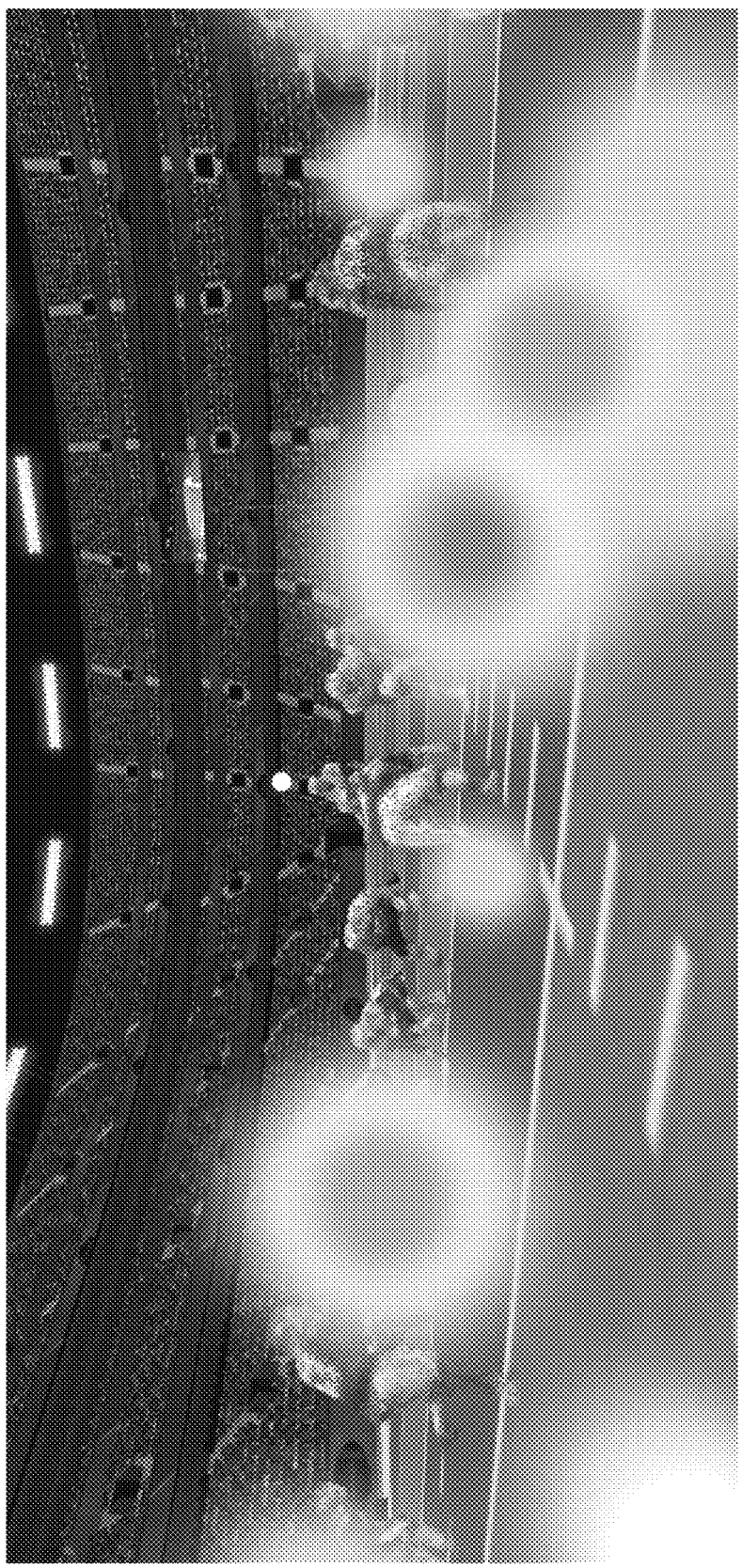
FIG. 19 is an embodiment of a heat map visualization showing the relative number of users looking at particular regions of the image.

FIG. 19 illustrates a heat map visualization showing the relative number of users looking at particular regions of the image.

Group and Sub-Group Heat Maps

A visual representation of where the most amount out of users' of groups you belong to, users' of groups that you do not belong to, and individually tracked users can be tracked in volumetric space over a duration of time and space. Similarly audio cues can also work to provide feedback that most users are located around a certain vantage point at a point of time and space.

This data representation can give users a sense of what vantage point they would prefer to experience.

Share Own and View Individuals' Volumetric Experience

In one embodiment, users are given the ability to curate their own viewing vantage points through a volumetric experience (e.g., to tell a story about the event) or experience another user's shared volumetric experience. This tool-set of personalized vantage points allows users to share or view other volumetric experiences from their chosen perspective.

These shared vantage viewing points for a 'real-life' moment can be recorded or broadcasted for other users to experience. In one embodiment, this is accomplished from within the medium in which the user consumes the experience (e.g., via a client application) in their HMD or mobile view. In addition, the shared volumetric experience may be exported to reach other users though social media 1260 or recording and saved to walk-through the curated vantage points again at another time.

Share Reactions within Volumetric Space

Prior to exporting user curated virtual camera vantage points, a user can also enhance the volumetric content experience. This adds an element of personalization in the chosen vantage point.

For example, in one embodiment, users incorporate their own personalized reactions to a piece of volumetric content. Taking a user's location within the volumetric content and time-stamp within a sequence provides the ability to add reactions like emoticons, recorded audio, or other tools to convey a user's feeling and emotional reaction for the 'real-world' volumetric experience.

Example: Emoticons

A visual representation of a user's emotional reaction can be augmented into the volumetric experience at a certain time-stamp and determined location. These user controlled viewing angle enhancements allow users to share their own and see other user's emotional reactions to an experience. In one embodiment, emoticons are placed by a user in their virtual camera field of view (FOV). A user can also see the emoticons of other users in live and non-live experiences that are located and placed in a set time for a relevant vantage point.

Video Quality Measurement for Virtual Cameras in Volumetric Immersive Media

As described above, a virtual camera renders a continuous view from live point cloud data created from an array of physical cameras installed in an event venue such as a stadium and offers an innovative and personalized way to view the event from any location.

The embodiments of the invention described below provide a quantitative measurement of the visual quality of a virtual camera. In one implementation, a virtual camera (VCAM) is aligned to a physical camera (PCAM) and pixel-to-pixel correspondence is established between the VCAM and PCAM images after compensating for distortion and misalignment. A quality metric is derived, referred to as the Virtual Camera Quality Composite (VCQC) score. In one specific embodiment, four measurements are used to determine the VCQC score: peak signal-to-noise ratio (PSNR), structural similarity metric (SSIM), point-cloud voxel density (PVD), and body-shape contour fitness (BCF). Thus, in addition to pixel-based objective measurements (e.g., PSNR) and structural-based subjective metrics (e.g., SSIM), the rendering of point-cloud data (PVD) in combination with the contour completeness of players (BCF) is evaluated for a more accurate quality measurement.

Volumetric Immersive Media System

Figure 20:
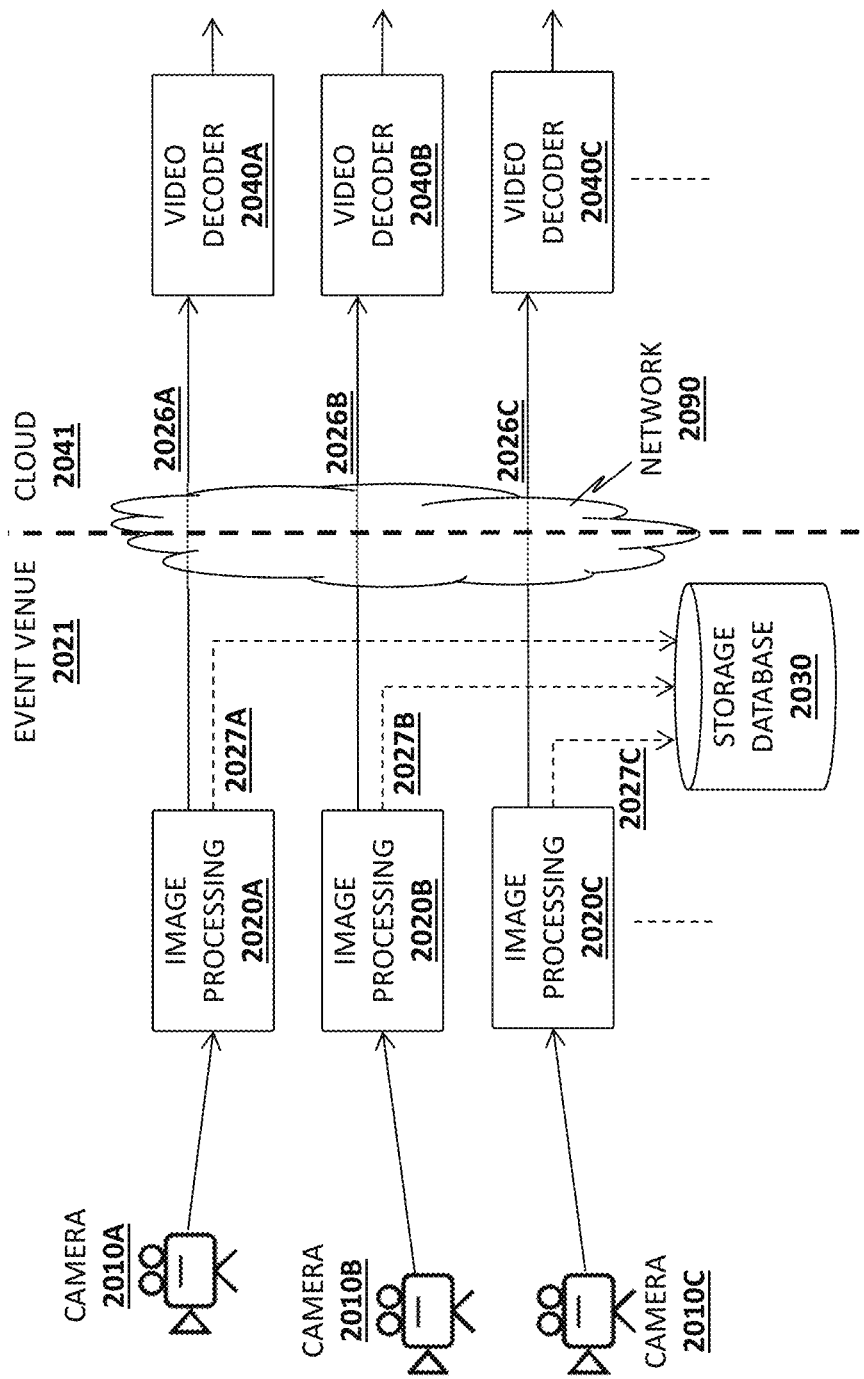
FIG. 20 is an embodiment of an immersive volumetric media system.

As illustrated in FIG. 20, for an immersive volumetric media system, there are 'N' cameras 2010A-C placed around an event venue 2021 which capture the event from different angles, completing a full 360° view of the stadium. In one embodiment, each of the 'N' cameras 2010A-C contains a single sensor capturing RAW data with frame resolution of 5120×3072 (5K), at 8 bits per pixel, and at 30 fps. Note, however, that the underlying principles of the invention are not limited to these specific configurations.

Each camera 2010A-C is connected to an image processing block 2020A-C which, in one embodiment, converts 5K RAW 8 bpp images into 5K RGB 24 bit images followed by conversion to YUV420, and downscaled to 4080×2448 (4K). The 5k RAW image streams 2027A-C may be stored in the storage database 2030 to be available for subsequent use (e.g., for image comparisons as described herein). In one implementation, H.264 encoding is applied to the 4080×2448 (4K) images using a GOP size of 30 and a data rate of 120 Mbps. The resulting H.265 streams 2026A-C are then transmitted over a network 2090 (e.g., the Internet) to a Cloud service 2041. In the cloud 2041, the incoming H.264 4080×2448@120 Mbps streams are decoded using one or more video decoders 2040A-C to output NV12 YUV frames (i.e., 4:2:0 frames at 30 FPS). However, as mentioned, the underlying principles of the invention are not limited to any particular protocol or set of configuration parameters.

Figure 21:
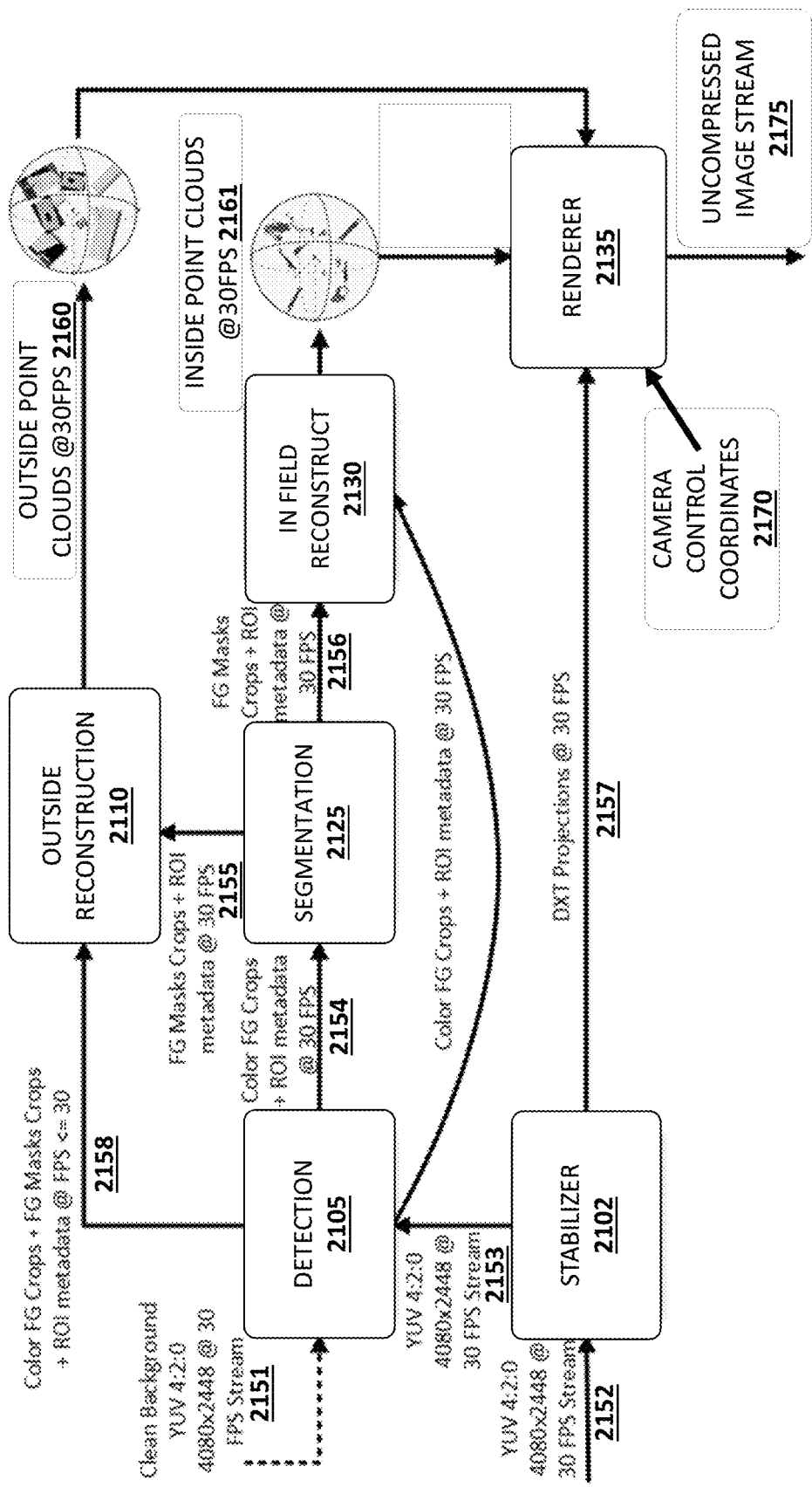
FIG. 21 is an embodiment of a stabilizer which processes an input stream to generate a stabilization vector.

Referring to FIG. 21, one embodiment includes a stabilizer 2102 which processes the NV12 YUV 30 FPS stream 2152 to generate a stabilization vector, remove distortion, and warp the images. A detection block 2105 takes in the stabilized frames 2153 produced by the stabilizer 2102 in addition to clean background (CB) YUV frames 2151, comprising the video recorded when the event venue 2021 is empty so that no players or objects are obstructing the background (e.g., a basketball court or football field). The detection block 2105 identifies objects such as players within the stabilized stream 2153 by comparing the stabilized frames 2153 with the CB frames 2151. In one embodiment, the detection block 2105 generates up to 200 foreground (FG) crops of objects detected in each frame and their corresponding regions of interest (ROIs). In this embodiment, the detection block 2105 assigns each object a unique ID, X and Y coordinates, a width value, and a height value, thereby producing bounding box information for each object. The players, the ball, and any other objects of interest on the field are thus detected and separated from the background.

In one embodiment, a segmentation block 2125, takes in the foreground crops and ROIs 2154 and produces segmented foreground mask crops 2156 and their corresponding ROIs. At this stage, all of the cropped objects on the field have been identified along with their sizes and positions.

Figure 22:
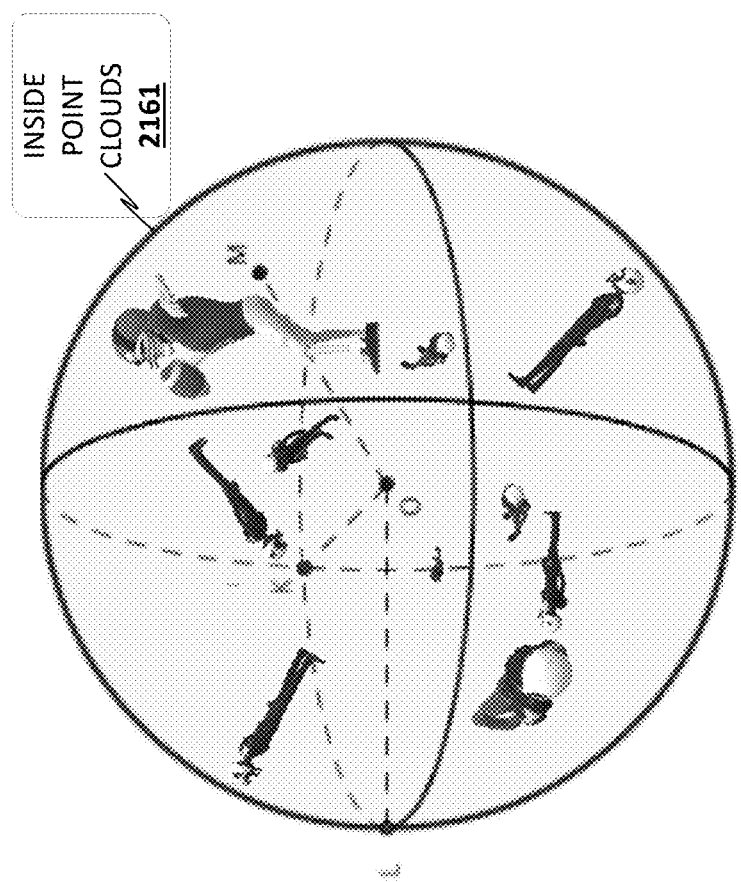
FIG. 22 is a mode detailed illustration of an inside point cloud.

In one embodiment, the in-field reconstruction block 2130 creates a point cloud of in-field objects 2161 ("inside" point cloud) based on the segmented foreground mask crops 2156 using a first set of point cloud generation techniques. A more detailed illustration of the inside point clouds 2161 is provided in FIG. 22.

The outside reconstruction block 2110 creates a point cloud of the field 2160 ("outside" point cloud) based on the color foreground crops, mask crops, and ROI data 2158 using a second set of point cloud generation techniques. In one embodiment, the first set of point cloud generation techniques comprise shape-from-silhouette 3D reconstruction techniques (e.g., visual hull processing) and levelset processing techniques. The second set of point cloud generation techniques include a point-based rendering approach based on object-space point interpolation such as XGen.

In one embodiment, the stabilizer 2102 also performs a transform such as the Direct X Transform (DXT) to generate uncompressed stabilized images 2157. If DXT is used, the uncompressed stabilized images 2157 may comprise DXT1 RGB textures. In this implementation, the renderer 2135 takes in all 'N' DXT1 textures with inside and outside point clouds 2160-2161 and renders a 2D image 2175 based on camera control input coordinates 2170, indicating a current position and direction of view of a virtual camera (e.g., as specified by user input). The virtual camera allows the end user to view the event from any point on the field with any normal 2D viewing devices including mobile phones and tablets. Alternatively, the user may also take advantage of the techniques described herein using a virtual reality head-mounted device (HMD).

The renderer 2135 uses the virtual camera control coordinates 2170 to determine the correct position and orientation for the uncompressed image stream 2175 delivered to the user's display. While the uncompressed image stream 2175 is a 2D image stream in the above-described embodiment, an alternate embodiment generates a panoramic 3D image stream.

One embodiment of the invention includes circuitry and logic to measure the quality of the image generated for each virtual camera (e.g., at the coordinates 2170 specified by users) to ensure the quality is above a specified threshold. In one embodiment, the goal is to match the virtual camera quality to that of a physical camera.

Figure 23:
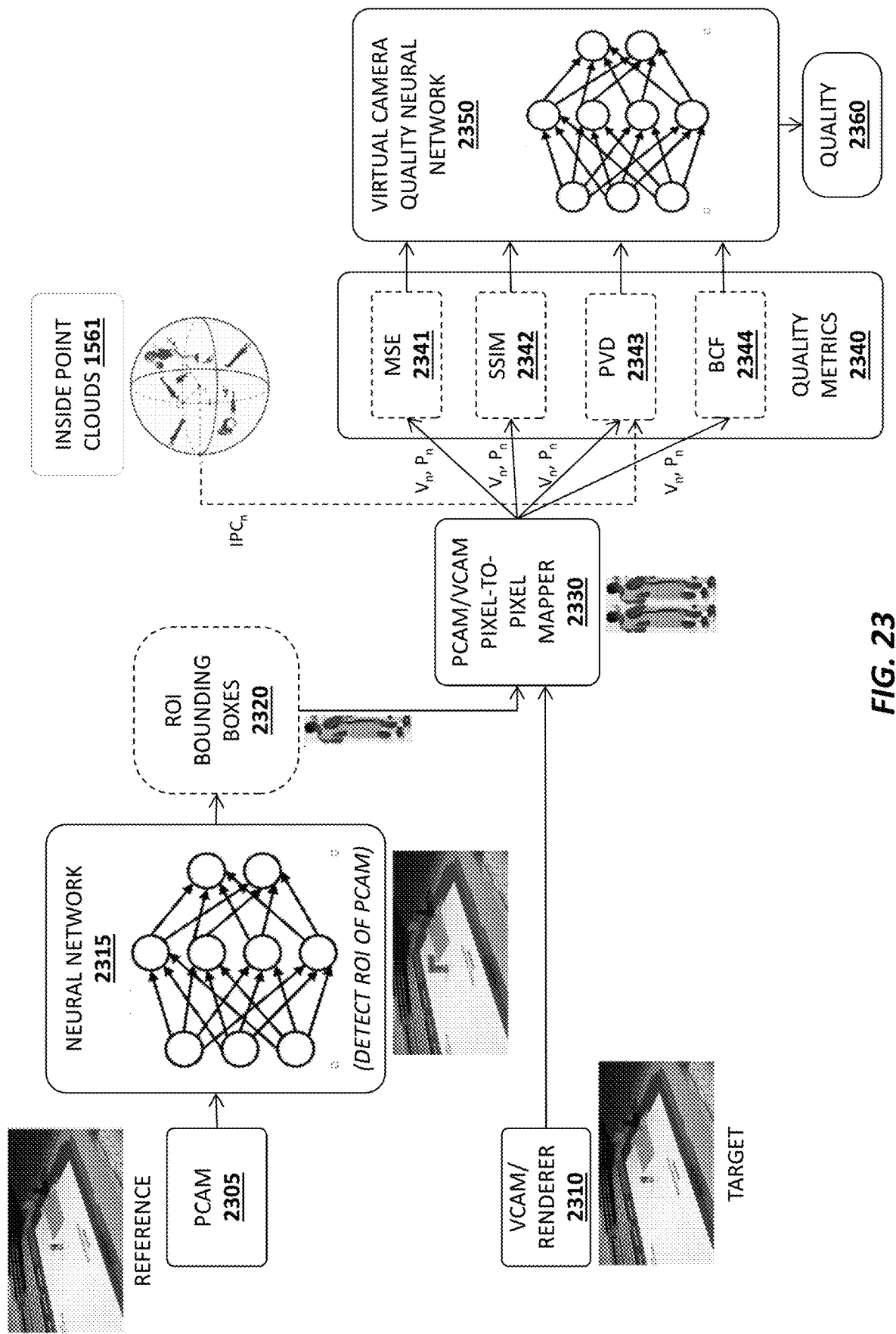
FIG. 23 is an embodiment of an apparatus for determining objective video quality of a virtual camera.

One embodiment of an apparatus for determining objective video quality of a virtual camera is depicted in FIG. 23.

Step 1: In one embodiment, a virtual camera (VCAM) 2310 is initially placed at the location of a physical camera (PCAM) 2305 (e.g., the virtual camera coordinates are set to the coordinates of the PCAM 2305). The physical camera reference image provides the ground truth for a virtual camera 2310. Consequently, in one embodiment, the VCAM 2310 is pointed from each of the 'N' PCAM 2305 coordinates to render the scenes, and use the video of a PCAM 2305 as reference for the VCAM 2310 for comparison.

Step 2: Detecting Region of Interest. Various real-time object detection techniques may be employed to identify regions of interest for the quality measurements. One of the algorithms is "You Only Look Once (YOLO)". YOLOv3 is extremely fast and accurate, applying a single neural network 2315 to the full image. In one embodiment, the neural network 2315 divides the image into regions and predicts bounding boxes 2320 and probabilities for each region. For example, the bounding boxes 2320 may be weighted in accordance with the predicted probabilities. The neural network 2315 evaluates the entire image at test time so its predictions are informed by global context in the image. It also makes predictions with a single network evaluation, unlike systems such as R-CNN (regions with convolutional neural networks) which require thousands of evaluations for a single image. This makes it extremely fast, more than 1000× faster than R-CNN and 100× faster than "Fast" R-CNN.

One embodiment uses pre-trained weights ('yolov3.weights') and executes the neural network 2315 to detect players on the field or court and draws bounding boxes 2320 surrounding them. These pre-trained weights are generic and therefore the execution time is in the few hundreds of milliseconds. However, the model is customized by training using the samples generated from the physical camera 2305 in live games, thereby reducing the weight file size. This leads to a drastic improvement in the performance of the neural network 2315 which can detect objects in a few milliseconds in real-time.

Figure 24:
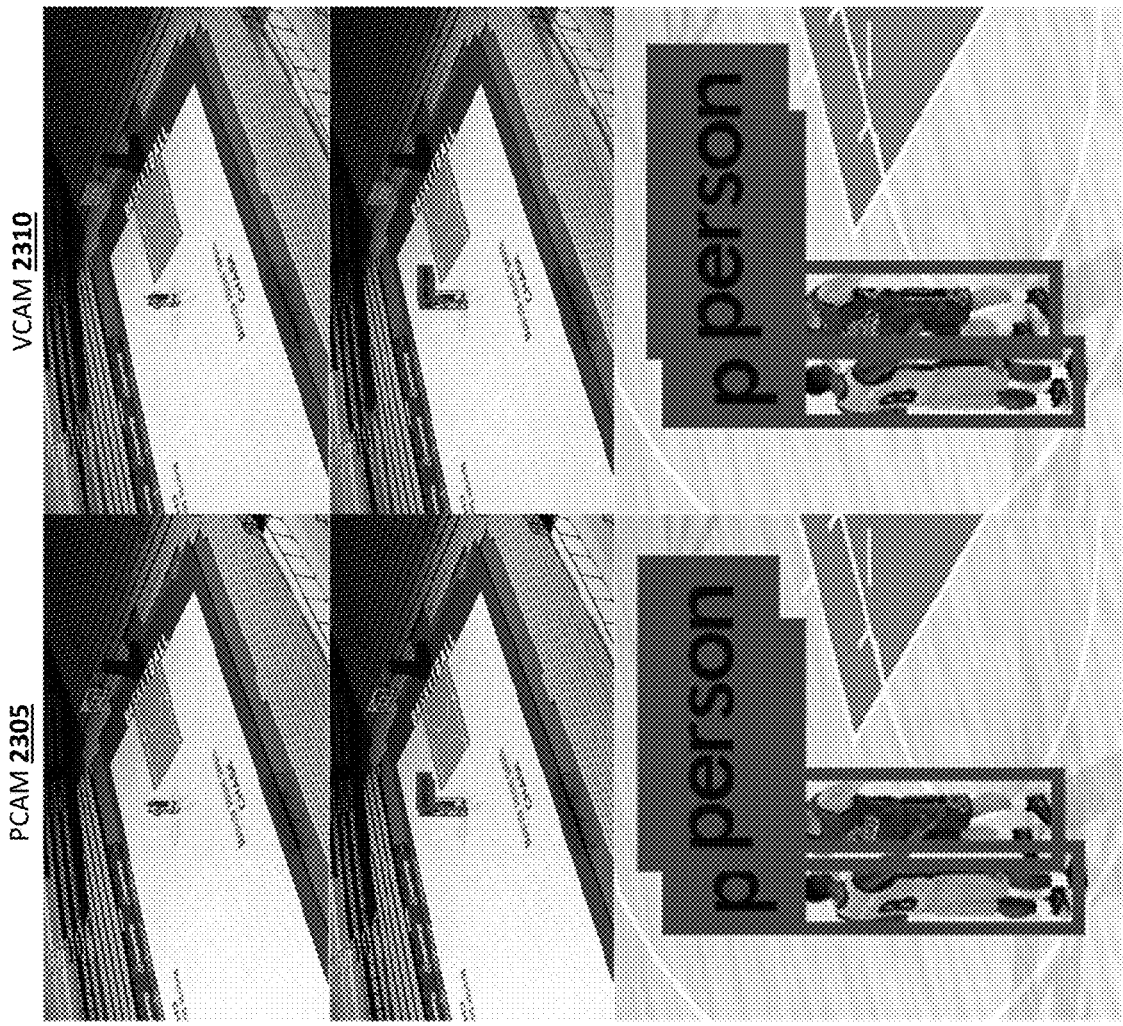
FIG. 24 illustrates an example sequence of PCAM and VCAM images.

In FIG. 24, the images on the left correspond to PCAM 2305 and the images on the right correspond to VCAM 2310 rendered at the PCAM 2305 location and orientation. The top row 2401 shows the original PCAM/VCAM images. The middle row 2402 is the output of YOLO with two objects detected in the scene and the third row 2403 is a zoomed-in version of the middle row 2402.

Returning to FIG. 23, the PCAM/VCAM pixel-to-pixel mapper 2330 establishes pixel-to-pixel correspondence between PCAM and VCAM images. The comparison of the video of a PCAM 2305 and that of a VCAM 2310 is not straightforward. First, the two video streams suffer from different artifacts and errors. While a PCAM video stream has typical artifacts like flares, lens distortion, sensor dust, different color balance, a VCAM video stream suffers from reconstruction and quantization errors. Second, the two image frames from PCAM and VCAM streams are not guaranteed to have pixel-to-pixel correspondence, especially when the PCAM has a wider field of view.

One embodiment of the PCAM/VCAM pixel-to-pixel mapper 2330 includes pre-processing circuitry and/or logic to compensate for distortion in PCAM images and establish the pixel-to-pixel correspondence between PCAM and VCAM images.

Figure 25:
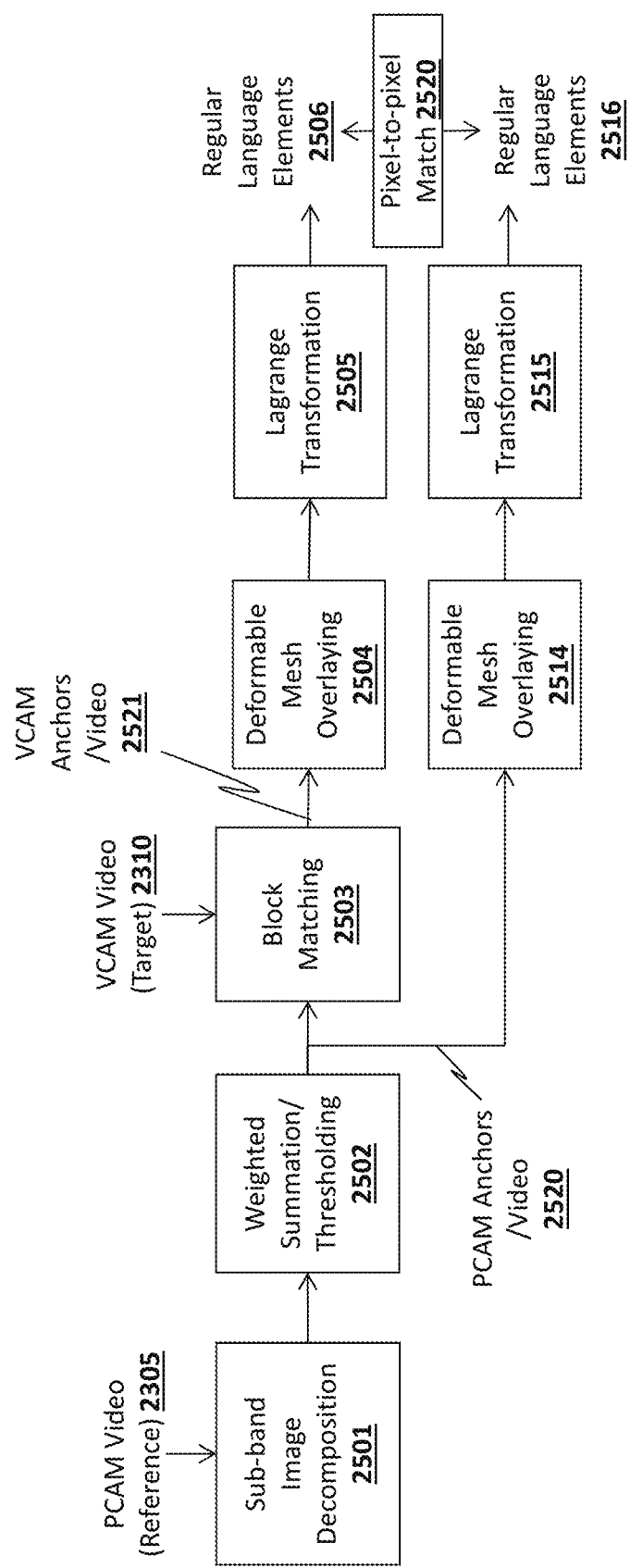
FIG. 25 is an embodiment of one particular implementation a PCAM video stream used as a reference for a VCAM video stream.

FIG. 25 illustrates one particular implementation a PCAM video stream 2305 used as a reference for a VCAM video stream 2310.

Extracting Stable Image Features within Bounding Boxes

In one embodiment, anchors are placed at stable image features within bounding boxes in the PCAM video stream 2305. Sub-band image decomposition circuitry/logic 2501 performs a polar-separable decomposition in the frequency domain (e.g., using a sub-band image decomposition technique such as Gabor filters and Steerable Pyramid). This provides independent representation of scale and orientation for a video frame. The sub-band image decomposition circuitry/logic 2501 generates an energy map for different scales and orientation that derives from the sub-band decomposition but provides substantial bias to the bands with a medium-sized scale. The intensity of the resultant energy map, after weighted summation and thresholding 2502, is used to allocate PCAM anchors in the PCAM video 2520 that mark the presence of stable image features to establish correspondence.

Establishing Correspondence Using Anchors

The block matching circuitry/logic 2503 uses the anchors in the PCAM video 2520 to find the best matched locations in the VCAM video 2310. As previously described, in one embodiment, video frames from different sources are time-stamped and synchronized using a 90 KHz reference clock. Any type of block matching algorithm may be used to establish the correspondence based on the anchors. Since there may be a relatively sparse distribution of anchors, the computing requirement for block matching circuitry/logic 2503 is not significant. The best matched position is used as the new location of the anchors in the VCAM video images 2521 for corresponding VCAM video anchors 2520. At this stage, anchor-to-anchor correspondence has been achieved between PCAM video streams and VCAM video streams.

Normalizing Bounding Boxes Using Deformable Mesh

In one embodiment, deformable mesh overlaying circuitry/logic 2504 applies a deformable mesh of Lagrange elements to the VCAM image frames with anchors 2521 and mesh overlaying circuitry/logic 2514 applies a deformable mesh of Lagrange elements to the PCAM image frames with anchors 2520 so that each nodal position of a Lagrange element matches with the position of the anchors. A deformable Lagrange element is suitable because the representation of pixels within the element is non-rigid and model to the $2^{nd}$ order.

Figure 26A:
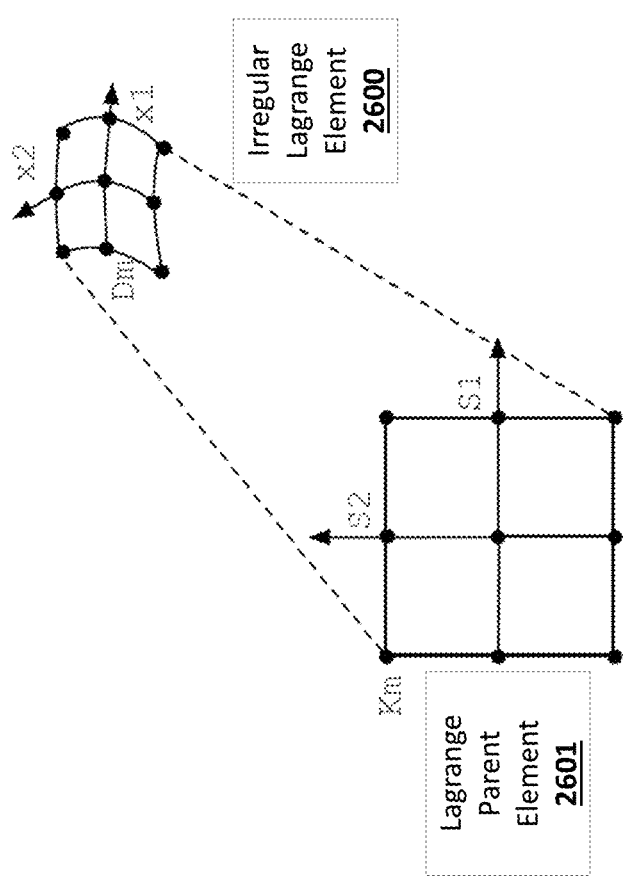

Referring to FIG. 26A, with the placement of the deformable mesh, the entire mesh with irregular elements, $D_m$ 2600 can be normalized by Lagrange transformation blocks 2505, 2515 (for the VCAM mesh and PCAM mesh, respectively) to a rectangle with regular parent elements, $K_m$ 2601. This normalization process using a shape function compensates for any distortion inherent in the video frames. One particular example of a shape function is illustrated in FIG. 26B. The anchor-to-anchor correspondence previously established may be used by the Lagrange transformation blocks 2505, 2515 to enforce pixel-to-pixel correspondence between PCAM and VCAM image frames when both undergo the same normalization.

Computing Quality Measurement Metrics

As shown in FIG. 23, in one implementation, after establishing pixel-to-pixel corresponding between PCAM and VCAM images, objective quality measurement metrics 2340 are determined. One or more of the following four types of quality measurements may be used as the basis for the metric evaluation: Mean Squared Error (MSE) 2341; Structural Similarity (SSIM) 2342; Point-cloud Voxel Density (PVD) 2343; and Body-shape Contour Fitness (BCF) 2344.

Mean Squared Error (MSE)

Figure 27B:
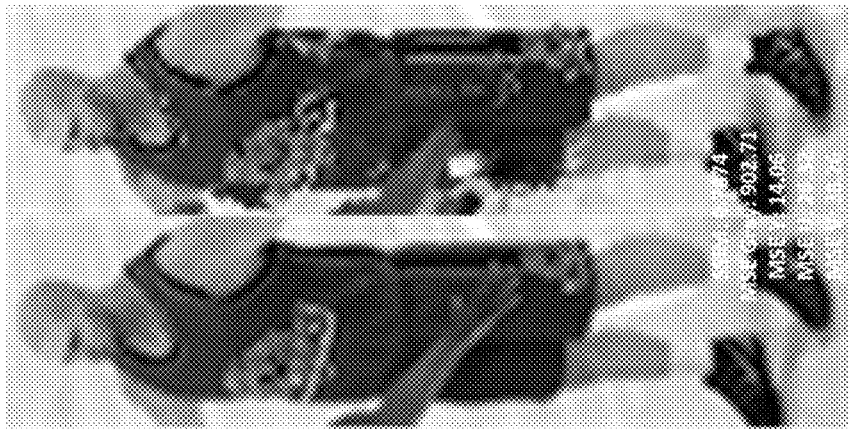
FIG. 27A-B illustrate different examples of metrics used to evaluate VCAM images.
Figure 27A:
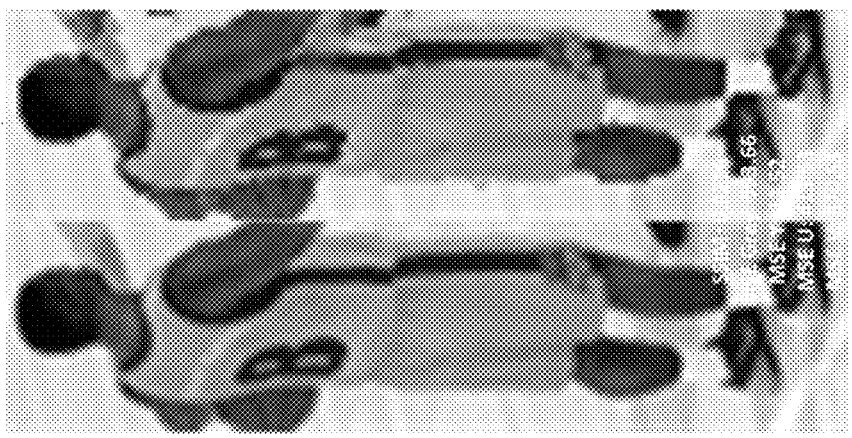

Mean Squared Error (MSE) provides the distance between pixel intensities. A value of 0 for MSE indicates perfect similarity while a value greater than one implies less similarity and will continue to grow as the average difference between pixel intensities increases as well. MSE of the two images may be computed as follows:

$$MSE = \frac{1}{mn}\sum_{i=0}^{m-1}\sum_{j=0}^{n-1}[P(i,j) - V(i,j)]^2$$

where P(i, j) and V(i, j) are pixel values of PCAM and VCAM images at location (i, j) respectively. In the illustrated example, a high MSE of 393.66 is observed for Person 1, as shown in FIG. 27A, and an MSE of 902.71 for Person 2 in FIG. 27B. Values are also shown for SSIM, grayscale MSE, and the MSE for the Y, U, and V coordinates.

Structural Similarity (SSIM)

Large distances between pixel intensities do not necessarily mean the contents of the images are dramatically different. In order to remedy some of the issues associated with MSE for image comparison, the Structural Similarity Index (SSIM) may be used. Unlike MSE, the SSIM value can vary between −1 and 1, where 1 indicates perfect similarity. The SSIM of two images may be determined as follows:

$$SSIM(x,y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $u_x$, $u_y$ are the average and $\sigma_x^2$ and $\sigma_y^2$ are the variance of x and y respectively and $\sigma_{xy}$ is the covariance of x and y. The variables $c_1$, $c_2$ are two variables used to stabilize the division with a weak denominator. SSIM attempts to model the perceived change in the structural information of the image, whereas MSE actually estimates the perceived errors. In the illustrated example, low SSIM scores are observed for Person 1 in FIG. 27A (0.9216) and Person 2 in FIG. 27B (0.7874).

Point-Cloud Voxel Density (PVD)

Point-cloud Voxel Density (PVD) indicates the degree of compactness of points in a Point-cloud. If PVD is too low, larger voxel sizes may be selected to fill the space but this may lead to a blocky rendered image. On the other hand, if the voxel size is too small compared to the spacing of points, the rendering may have significant unfilled spaces. This can be seen in FIG. 28, where the top-left image 2801 corresponds to sparse rendering based on Point Size 1 and the bottom-right image 2802 corresponds to blocky rendering based on Point Size 6. The images in-between from right-to-left and top-to-bottom correspond to consecutively larger Point Sizes (e.g., 2-5).

Figure 29:
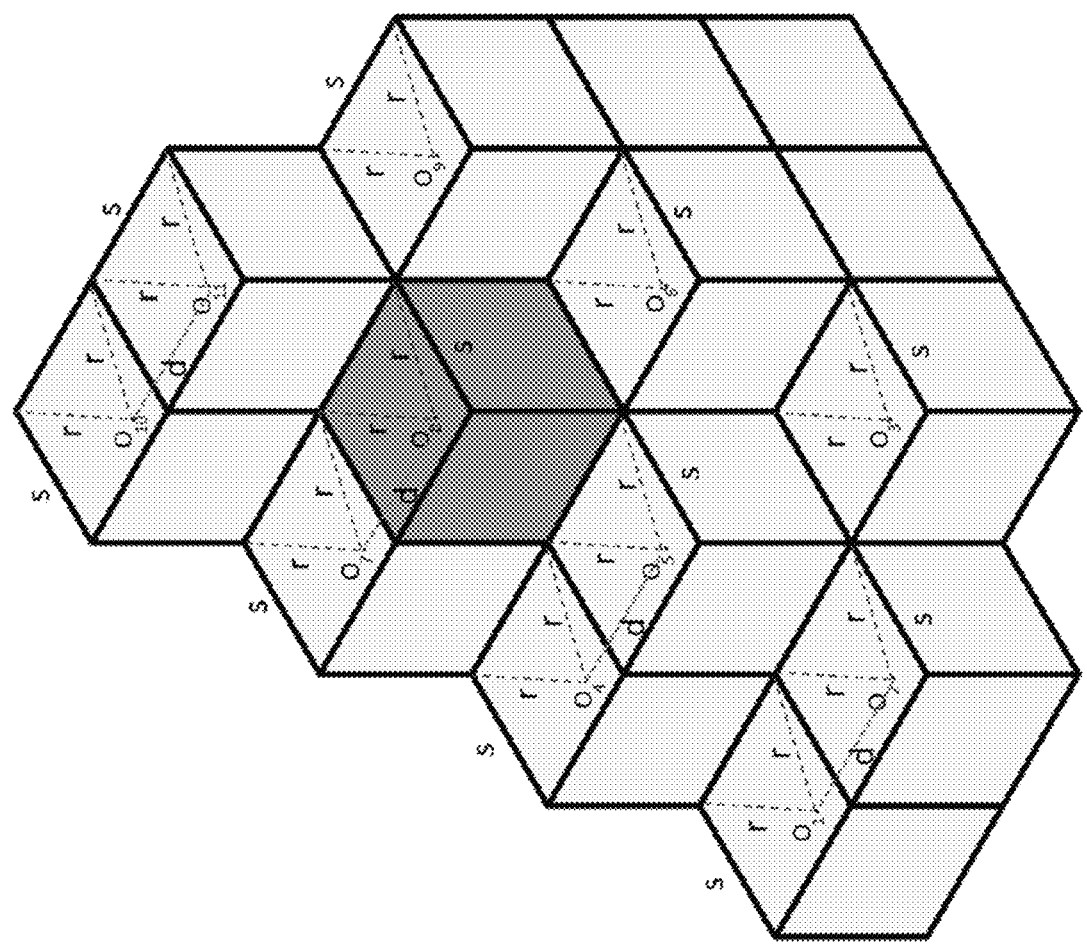
FIG. 29 illustrates an example of a series of Voxels of a given point size.

FIG. 29 illustrates a series of Voxels of Point Size 's' centered at origin $O_1, O_2, \ldots O_{11}$ which is at a distance 'r' from the vertices of the cube measured as:

$$r = \frac{s\sqrt{3}}{2}$$

whereas '$d_k$' is the distance between the nearest neighbors.

The Euclidean distance between two points $O_1$ ($x_1$, $y_1$, $z_1$) and $O_2$ ($x_2$, $y_2$, $z_2$) is measured on a 3D space as:

$$d_k = \sqrt{(x_2-x_1)^2 + (y_2-y_1)^2 + (z_2-z_1)^2}$$

where k ∈ [1, N−1] and 'N' is the total number of points in the Point cloud.

The average distance between the nearest neighbors in a point cloud is determined by:

$$r_\theta = \frac{1}{N}\sum_{k=1}^{N-1} d_k \text{ and } s_\theta = \frac{2r_\theta}{\sqrt{3}}$$

where 'sθ' is the Optimal Point Size of the Voxel.

In order to penalize points in a Point Cloud that are sparsely distributed, the ratio of points in the bounding box generated by the previous operation is determined and the volume of the cuboid.

$$\psi = \#(\text{points inside bounding box})/w.\, l.\, h$$

where 'w' is the width, 'l' is the length, and 'h' is the height of the bounding box generated from the VCAM on the Point Cloud.

Body-shape Contour Fitness (BCF)

As discussed, the normalized PCAM and VCAM image frames in the pre-processing block established pixel-to-pixel correspondence between the two images. While MSE and SSIM provide objective and subjective assessment of similarities between them, these measures do not take the artifacts inherent to PCAM into account.

To address this limitation, one embodiment of the invention includes a body-shape contour fitness (BCF) measure for the quality of a virtual camera that does not suffer such artifacts. The central idea for BCF is to compare the contours between PCAM and VCAM images. This measure is the best to pinpoint the problematic areas in reconstruction such as tear, missing limps, boxy effect and excessive discontinuities in the VCAM image frames.

Figure 30:
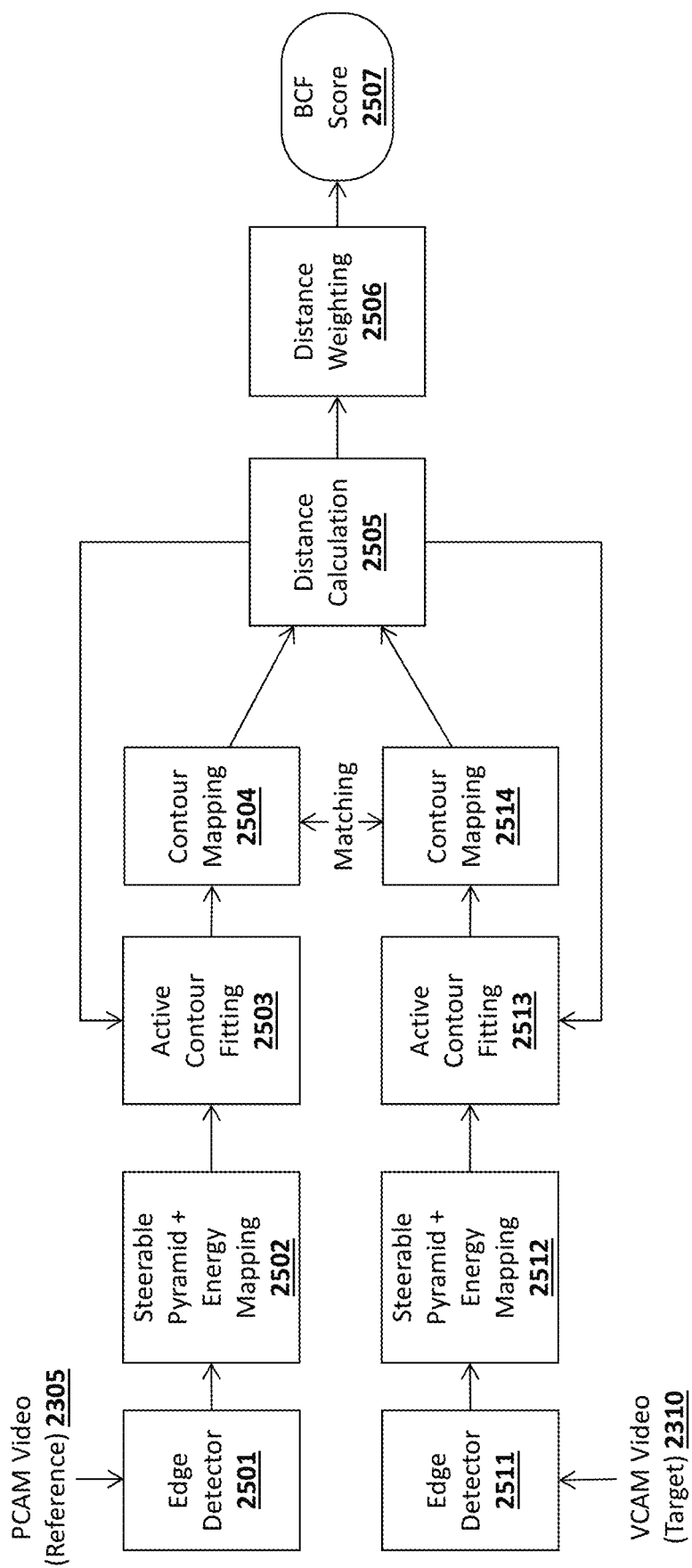
FIG. 30 is an embodiment of an apparatus to implement a sequence of operations to generate a BCF score.

FIG. 30 illustrates one embodiment of an apparatus to implement a sequence of operations to generate a BCF score. In one embodiment, the BCF starts with an edge detector 2501 performing edge detection of the PCAM image frame 2305 and an edge detector 2511 performing edge detection of the VCAM image frame 2310. Any form of edge detection filters such as Canny edge detection filters may be used. The objective is to identify strong continuities from the extracted edges.

In one implementation, steerable pyramid and energy mapping logic 2502, 2512 applies band decomposition (e.g., steerable pyramid) to the edges identified by edge detectors 2501, 2511, respectively. In one embodiment, more bias is given for large scale sizes, and horizontal and vertical orientations when forming the energy map. Using the energy map those edges that have a high magnitude of energy (e.g., above a specified threshold) are retained and passed to active contour fitting logic 2403, 2513.

Fitting with Active Contours

In one embodiment, active contour fitting logic 2503, 2513 comprises a deformable spline which fits a 'strong' edge provided from the steerable pyramid and energy mapping logic 2502, 2512, respectively. The active contour uses a combination of energy terms to give an optimized contour in terms of lines, edges and continuities. After active contour fitting for both PCAM and VCAM frames, contour mapping 2504, 2514 is performed to determine the correspondence between a contour in PCAM and a contour in VCAM, respectively. In one embodiment, this is accomplished by matching the proximity between the two contours, their relative length to each other, and the deviation of their principal orientation.

Calculating Distance Between Contour Pairs

In one implementation, distance calculation logic 2505 determines the difference or "distance" between each contour pair provided from contour mapping logic 2504 and 2514. For example, the Fréchet distance may be used, which is a measure of similarity between curves that takes both the location and ordering of the points along the curves into account. Distance weighting logic 2506 applies weights to generate the final BCF score 2507. The BCF score is the sum of all distances with weights that give bias to long and continuous curves.

Calculating Virtual Camera Quality Composite Score (VCQC)

Referring again to FIG. 23, one embodiment of the invention includes a virtual camera quality neural network 2350 to generate a final quality value 2360 based on the quality metrics 2340 described above. In particular, the quality measurement metrics 2340 include one or more of: MSE 2341, SSIM 2342, PVD 2343, and BCE 2344, which are used as the inputs. In one embodiment, another neural network 2350, referred to here as the "virtual camera quality neural network" uses these inputs to generate a virtual camera quality composite score (VCQC) 2360.

In one particular implementation, the training samples are 10-20 second clips of 1920×1080 @30 fps which can be generated from live events at the event location (e.g., basketball court, football stadium, etc). The Point Cloud can be constructed with a Point Size varying from 1 to 7 and the corresponding VCAM video sequences is rendered. The Mean Opinion Score (MOS) in the range of [0, 100] is provided as the subjective quality assessment 2360 of each of these sequences. In one embodiment, the neural network 2350 is trained to fine tune the weights and generate a final VCQC score 2360.

Figure 31:
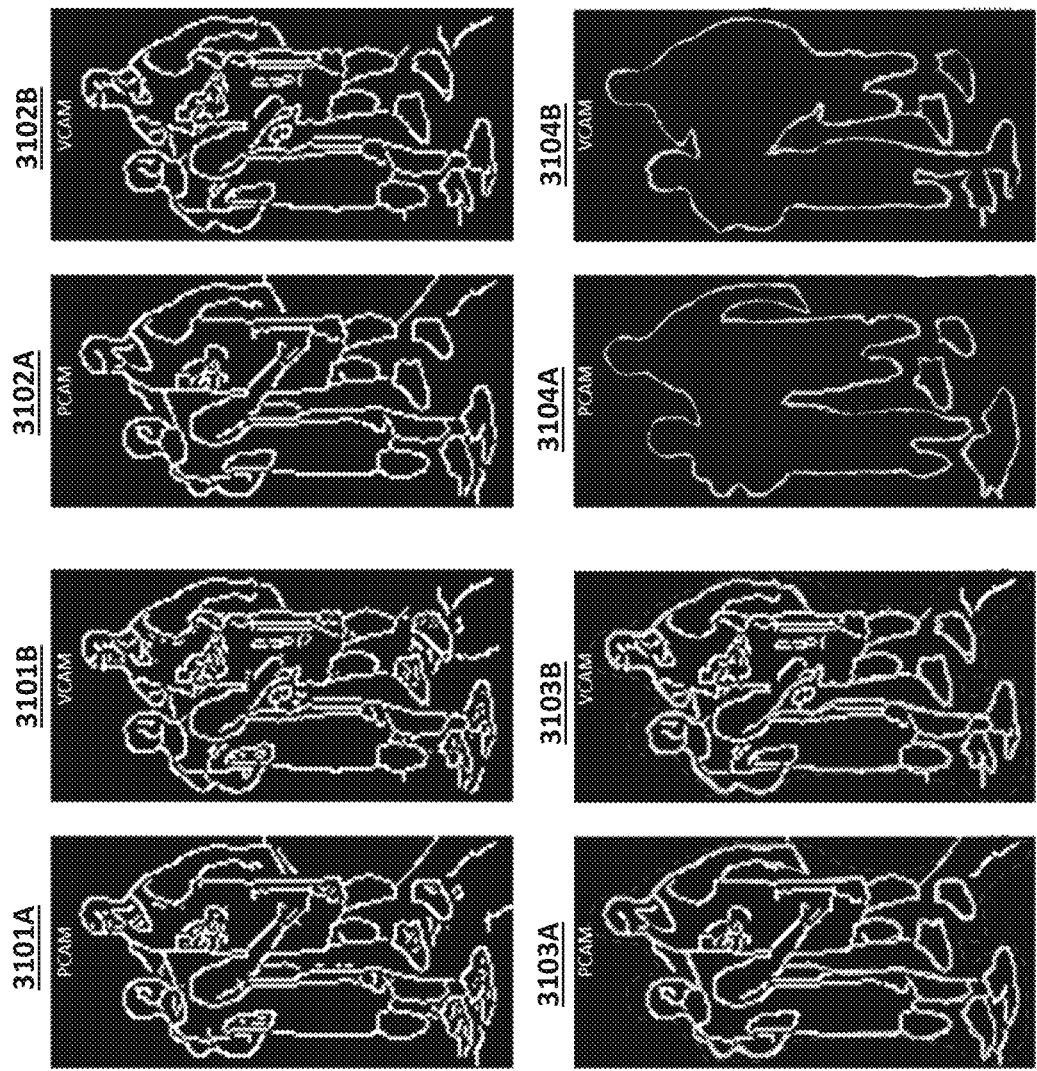
FIG. 31 is an embodiment of a side-by-side comparison of PCAM and VCAM images using the above techniques.

FIG. 31 illustrates a side-by-side comparison of PCAM and VCAM images using the above techniques. PCAM image 3101A and VCAM image 3101B are shown when canny edge detection is used. Detection of strong edges is shown in images 3102A-B. Active contour model snake is shown for PCAM/VCAM images 3103A-B and calculation of the Fréchet distance between each contour pair is shown for PCAM/VCAM images 3104A-B.

Figure 32:
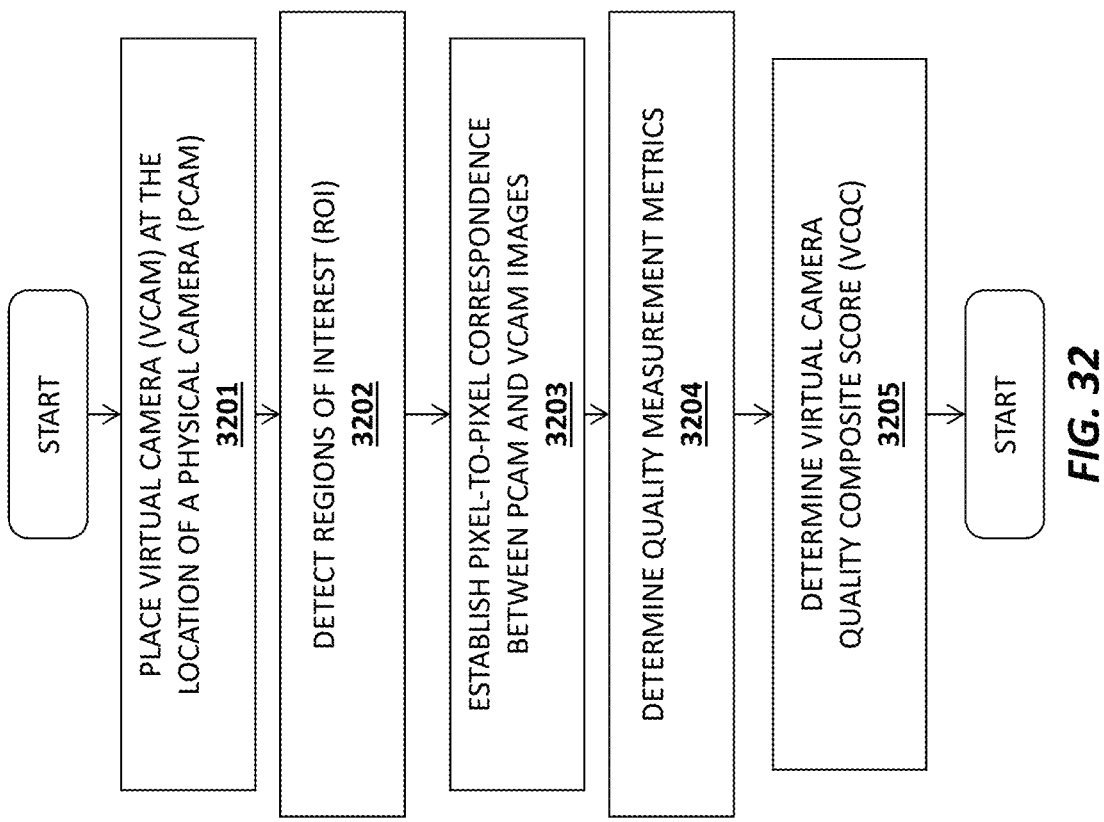
FIG. 32 is an embodiment of a method for determining virtual camera quality.
Figure 32:
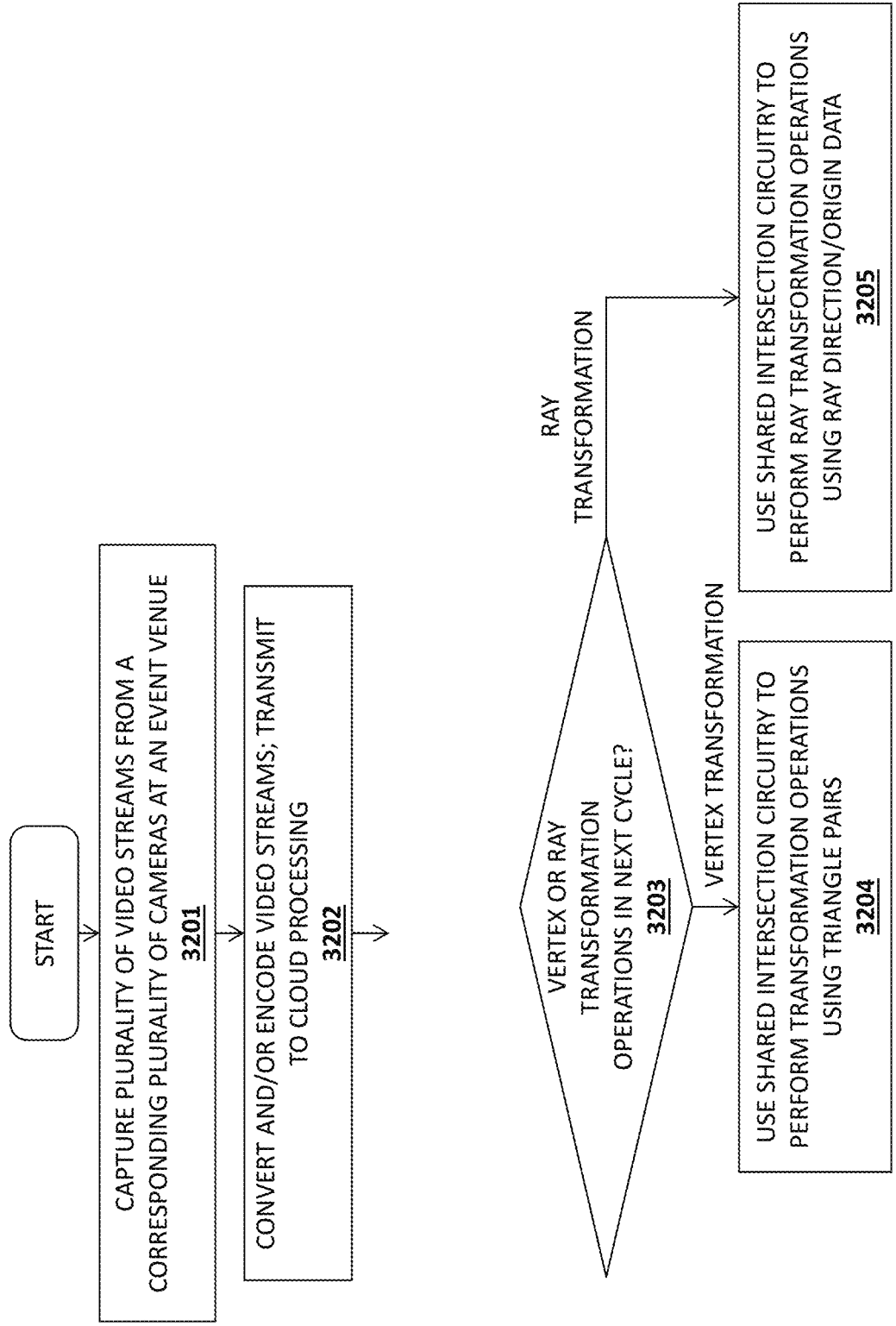

One embodiment of a method for determining virtual camera quality is illustrated in FIG. 32. The method may be implemented within the context of the system architectures described above, but is not limited to any particular architecture.

At 3201, a virtual camera is placed at the location and direction of a physical camera. As mentioned, because the PCAM in this embodiment provides the ground truth for a VCAM, the VCAM may be pointed from each of the 'N' PCAM coordinates to render the scenes, and use the video of a PCAM as reference for the VCAM for comparison.

At 3202, regions of interest (ROI) are identified. In some of the above examples, the ROIs are images of basketball players on the basketball court. Various different object detection techniques may be used to identify ROIs. In one particular implementation, a neural network or other machine learning implementation may be used to identify the various regions of interest within the PCAM images and responsively generate ROI bounding boxes and associated metadata (e.g., display coordinates, width, height, etc).

At 3203, pixel-to-pixel correspondence is determined between the PCAM images and the VCAM images. In one embodiment, this includes placing anchors at stable image features within the PCAM video, establishing correspondence between the VCAM and PCAM images using the anchors, normalizing bounding boxes using a deformable mesh, and performing a Lagrange transformation. However, various other techniques may be used to determine the pixel-to-pixel correspondence, depending on the quality and format of the VCAM and/or PCAM images.

At 3204, the VCAM images are evaluated using various quality measurement metrics. As mentioned, the quality measurement metrics may include one or more of: Mean Squared Error (MSE), Structural Similarity (SSIM), Point-cloud Voxel Density (PVD), and Body-shape Contour Fitness (BCF). While these quality measurement metrics are provided as examples, various other quality measurement metrics may be used.

At 3205, the quality measurement metrics are combined to arrive at a virtual camera quality composite (VCQC) value. In one embodiment, this is accomplished with a Deep Neural Network or other machine learning implementation using the quality measurement metrics as inputs and generating a single Virtual Camera Quality Composite (VCQC) score as an output.

The use of virtual cameras will soon become an important feature for volumetric immersive media. Consequently, the ability to measure the perceptual quality of virtual cameras as described above is critical for automatically choosing high quality views for users and thereby enhancing the overall volumetric video experience.

EXAMPLES

The following are example implementations of different embodiments of the invention.

Example 1. A method comprising: detecting regions of interest within a first image generated from a first physical camera (PCAM) positioned at first coordinates; generating a second image from a virtual camera (VCAM) positioned at the first coordinates; establishing pixel-to-pixel correspondence between the first image and the second image; determining a quality value for the second image by evaluating the second image in view of the first image.

Example 2. The method of example 1 wherein evaluating the second image in view of the first image comprises comparing one or more features in the first image with corresponding features in the second image.

Example 3. The method of example 1 wherein evaluating the second image in view of the first image comprises determining differences in pixel intensities and/or contours between the first and second images.

Example 4. The method of example 3 wherein evaluating the second image in view of the first image further comprises performing Mean Squared Error (MSE) evaluation to generate an MSE value, performing a Structural Similarity (SSIM) evaluation to generate an SSIM value, performing a Point-cloud Voxel Density (PVD) evaluation to generate a PVD value, and/or performing a Body-shape Contour Fitness (BCF) evaluation to generate a BCF value.

Example 5. The method of example 4 wherein evaluating the second image in view of the first image comprises implementing a neural network using one or more of the MSE value, SSIM value, PVD value, and/or BCF value as inputs, the neural network to responsively generate the quality value.

Example 6. The method of example 1 wherein establishing pixel-to-pixel correspondence between the first image and the second image comprises extracting stable image features within bounding boxes, establishing correspondence between the first image and the second image using anchors.

Example 7. The method of example 1 wherein detecting regions of interest comprises performing object detection operations using weights to detect objects within the first image.

Example 8. The method of example 7 wherein the object detection operations using weights are performed by a neural network using the first image as input and generating regions of interest as output.

Example 9. The method of example 1 further comprising: detecting regions of interest within a third image generated from a second PCAM positioned at second coordinates; generating a fourth image from a virtual camera (VCAM) positioned at the second coordinates; establishing pixel-to-pixel correspondence between the third image and the fourth image; and determining a quality value for the fourth image by evaluating the fourth image in view of the third image.

Example 10. A system comprising: a region of interest (ROI) detector to detect regions of interest within a first image generated from a first physical camera (PCAM) positioned at first coordinates; virtual camera circuitry and/or logic to generate a second image positioned at the first coordinates; image comparison circuitry and/or logic to establish pixel-to-pixel correspondence between the first image and the second image; an image quality evaluator to determine a quality value for the second image by evaluating the second image in view of the first image.

Example 11. The system of example 10 wherein the image quality evaluator is to evaluate the second image in view of the first image by Comparing one or more features in the first image with corresponding features in the second image.

Example 12. The system of example 10 wherein the image quality evaluator is to evaluate the second image in view of the first image by determining differences in pixel intensities and/or contours between the first and second images.

Example 13. The system of example 12 wherein the image quality evaluator is to perform a Mean Squared Error (MSE) evaluation to generate an MSE value, perform a Structural Similarity (SSIM) evaluation to generate an SSIM value, perform a Point-cloud Voxel Density (PVD) evaluation to generate a PVD value, and/or perform a Body-shape Contour Fitness (BCF) evaluation to generate a BCF value.

Example 14. The system of example 13 further comprising: a neural network to responsively generate the quality value based on one or more of the MSE value, SSIM value, PVD value, and/or BCF value.

Example 15. The system of example 10 wherein establishing pixel-to-pixel correspondence between the first image and the second image comprises extracting stable image features within bounding boxes, establishing correspondence between the first image and the second image using anchors.

Example 16. The system of example 10 wherein detecting regions of interest comprises performing object detection operations using weights to detect objects within the first image.

Example 17. The system of claim 16 wherein the ROI detector comprises a neural network using the first image as input and generating the regions of interest as output.

Example 18. The system of claim 10 wherein the region of interest (ROI) detector is to detect regions of interest within a third image generated from a second physical camera (PCAM) positioned at second coordinates; the virtual camera circuitry and/or logic to generate a fourth image positioned at the second coordinates; the image comparison circuitry and/or logic to establish pixel-to-pixel correspondence between the third image and the fourth image; and an image quality evaluator to determine a quality value for the fourth image by evaluating the fourth image in view of the third image.

Example 19. A machine-readable medium having program code stored thereon which, when executed by a machine, causes the machine to perform the operations of: detecting regions of interest within a first image generated from a first physical camera (PCAM) positioned at first coordinates; generating a second image from a virtual camera (VCAM) positioned at the first coordinates; establishing pixel-to-pixel correspondence between the first image and the second image; determining a quality value for the second image by evaluating the second image in view of the first image.

Example 20. The machine-readable medium of example 19 wherein evaluating the second image in view of the first image comprises comparing one or more features in the first image with corresponding features in the second image.

Example 21. The machine-readable medium of example 19 wherein evaluating the second image in view of the first image comprises determining differences in pixel intensities and/or contours between the first and second images.

Example 22. The machine-readable medium of example 21 wherein evaluating the second image in view of the first image further comprises performing Mean Squared Error (MSE) evaluation to generate an MSE value, performing a Structural Similarity (SSIM) evaluation to generate an SSIM value, performing a Point-cloud Voxel Density (PVD) evaluation to generate a PVD value, and/or performing a Body-shape Contour Fitness (BCF) evaluation to generate a BCF value.

Example 23. The machine-readable medium of example 22 wherein evaluating the second image in view of the first image comprises implementing a neural network using one or more of the MSE value, SSIM value, PVD value, and/or BCF value as inputs, the neural network to responsively generate the quality value.

Example 24. The machine-readable medium of example 19 wherein establishing pixel-to-pixel correspondence between the first image and the second image comprises extracting stable image features within bounding boxes, establishing correspondence between the first image and the second image using anchors.

Example 25. The machine-readable medium of example 19 wherein detecting regions of interest comprises performing object detection operations using weights to detect objects within the first image.

Example 26. The machine-readable medium of example 25 wherein the object detection operations using weights are performed by a neural network using the first image as input and generating regions of interest as output.

Example 27. The machine-readable medium of example 19 further comprising program code to cause the machine to perform the operations of: detecting regions of interest within a third image generated from a second PCAM positioned at second coordinates; generating a fourth image from a virtual camera (VCAM) positioned at the second coordinates; establishing pixel-to-pixel correspondence between the third image and the fourth image; and determining a quality value for the fourth image by evaluating the fourth image in view of the third image.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
   detecting regions of interest within a first image generated from a first physical camera (PCAM) positioned at first coordinates;
   generating a second image from a virtual camera (VCAM) positioned at the first coordinates;
   establishing pixel-to-pixel correspondence between the first image and the second image; and
   determining a quality value for the second image by evaluating the second image in view of the first image.

2. The method of claim 1 wherein evaluating the second image in view of the first image comprises comparing one or more features in the first image with corresponding features in the second image.

3. The method of claim 1 wherein evaluating the second image in view of the first image comprises determining differences in pixel intensities and/or contours between the first and second images.

4. The method of claim 3 wherein evaluating the second image in view of the first image further comprises performing Mean Squared Error (MSE) evaluation to generate an MSE value, performing a Structural Similarity (SSIM) evaluation to generate an SSIM value, performing a Point-cloud Voxel Density (PVD) evaluation to generate a PVD value, and/or performing a Body-shape Contour Fitness (BCF) evaluation to generate a BCF value.

5. The method of claim 4 wherein evaluating the second image in view of the first image comprises implementing a neural network using one or more of the MSE value, SSIM value, PVD value, and/or BCF value as inputs, the neural network to responsively generate the quality value.

6. The method of claim 1 wherein establishing pixel-to-pixel correspondence between the first image and the second image comprises extracting stable image features within bounding boxes, establishing correspondence between the first image and the second image using anchors.

7. The method of claim 1 wherein detecting regions of interest comprises performing object detection operations using weights to detect objects within the first image.

8. The method of claim 7 wherein the object detection operations using weights are performed by a neural network using the first image as input and generating regions of interest as output.

9. The method of claim 1 further comprising:
detecting regions of interest within a third image generated from a second PCAM positioned at second coordinates;
generating a fourth image from a virtual camera (VCAM) positioned at the second coordinates;
establishing pixel-to-pixel correspondence between the third image and the fourth image; and
determining a quality value for the fourth image by evaluating the fourth image in view of the third image.

10. A system comprising:
region of interest (ROI) detector circuitry to detect regions of interest within a first image generated from a first physical camera (PCAM) positioned at first coordinates;
virtual camera circuitry to generate a second image positioned at the first coordinates;
image comparison circuitry to establish pixel-to-pixel correspondence between the first image and the second image; and
image quality evaluator circuitry to determine a quality value for the second image by evaluating the second image in view of the first image.

11. The system of claim 10 wherein the image quality evaluator circuitry is to evaluate the second image in view of the first image by comparing one or more features in the first image with corresponding features in the second image.

12. The system of claim 10 wherein the image quality evaluator circuitry is to evaluate the second image in view of the first image by determining differences in pixel intensities and/or contours between the first and second images.

13. The system of claim 12 wherein the image quality evaluator circuitry is to perform a Mean Squared Error (MSE) evaluation to generate an MSE value, perform a Structural Similarity (SSIM) evaluation to generate an SSIM value, perform a Point-cloud Voxel Density (PVD) evaluation to generate a PVD value, and/or perform a Body-shape Contour Fitness (BCF) evaluation to generate a BCF value.

14. The system of claim 13 further comprising:
a neural network to responsively generate the quality value based on one or more of the MSE value, SSIM value, PVD value, and/or BCF value.

15. The system of claim 10 wherein establishing pixel-to-pixel correspondence between the first image and the second image comprises extracting stable image features within bounding boxes, establishing correspondence between the first image and the second image using anchors.

16. The system of claim 10 wherein detecting regions of interest comprises performing object detection operations using weights to detect objects within the first image.

17. The system of claim 16 wherein the ROI detector circuitry comprises a neural network using the first image as input and generating the regions of interest as output.

18. The system of claim 10 wherein the region of interest (ROI) detector circuitry is to detect regions of interest within a third image generated from a second physical camera (PCAM) positioned at second coordinates; the virtual camera circuitry to generate a fourth image positioned at the second coordinates; the image comparison circuitry to establish pixel-to-pixel correspondence between the third image and the fourth image; and the image quality evaluator circuitry to determine a quality value for the fourth image by evaluating the fourth image in view of the third image.

19. A non-transitory machine-readable medium having program code stored thereon which, when executed by a machine, causes the machine to perform the operations of:
detecting regions of interest within a first image generated from a first physical camera (PCAM) positioned at first coordinates;
generating a second image from a virtual camera (VCAM) positioned at the first coordinates;
establishing pixel-to-pixel correspondence between the first image and the second image; and
determining a quality value for the second image by evaluating the second image in view of the first image.

20. The non-transitory machine-readable medium of claim 19 wherein evaluating the second image in view of the first image comprises comparing one or more features in the first image with corresponding features in the second image.

21. The non-transitory machine-readable medium of claim 19 wherein evaluating the second image in view of the first image comprises determining differences in pixel intensities and/or contours between the first and second images.

22. The non-transitory machine-readable medium of claim 21 wherein evaluating the second image in view of the first image further comprises performing Mean Squared Error (MSE) evaluation to generate an MSE value, performing a Structural Similarity (SSIM) evaluation to generate an SSIM value, performing a Point-cloud Voxel Density (PVD) evaluation to generate a PVD value, and/or performing a Body-shape Contour Fitness (BCF) evaluation to generate a BCF value.

23. The non-transitory machine-readable medium of claim 22 wherein evaluating the second image in view of the first image comprises implementing a neural network using one or more of the MSE value, SSIM value, PVD value, and/or BCF value as inputs, the neural network to responsively generate the quality value.

24. The non-transitory machine-readable medium of claim 19 wherein establishing pixel-to-pixel correspondence between the first image and the second image comprises extracting stable image features within bounding boxes, establishing correspondence between the first image and the second image using anchors.

25. The non-transitory machine-readable medium of claim 19 wherein detecting regions of interest comprises performing object detection operations using weights to detect objects within the first image.

26. The non-transitory machine-readable medium of claim 25 wherein the object detection operations using weights are performed by a neural network using the first image as input and generating regions of interest as output.

27. The non-transitory machine-readable medium of claim 19 further comprising program code to cause the machine to perform the operations of:
   detecting regions of interest within a third image generated from a second PCAM positioned at second coordinates;
   generating a fourth image from a virtual camera (VCAM) positioned at the second coordinates;
   establishing pixel-to-pixel correspondence between the third image and the fourth image; and
   determining a quality value for the fourth image by evaluating the fourth image in view of the third image.

* * * * *